US012672640B2

(12) United States Patent
Woodhouse et al.

(10) Patent No.: US 12,672,640 B2
(45) Date of Patent: Jul. 7, 2026

(54) APPARATUS TO GUIDE ANIMALS AND METHOD THEREFOR

(71) Applicant: HALTER USA INC, San Francisco, CA (US)

(72) Inventors: Callum Woodhouse, Auckland (NZ); Peter Nieuwenhuizen, Auckland (NZ)

(73) Assignee: HALTER USA INC, San Francisco, CA (US)

( * ) Notice: Subject to any disclaimer, the term of this patent is extended or adjusted under 35 U.S.C. 154(b) by 0 days.

(21) Appl. No.: 18/719,055

(22) PCT Filed: Dec. 14, 2022

(86) PCT No.: PCT/IB2022/062172
§ 371 (c)(1),
(2) Date: Jun. 12, 2024

(87) PCT Pub. No.: WO2023/111868
PCT Pub. Date: Jun. 22, 2023

(65) Prior Publication Data
US 2025/0049000 A1 Feb. 13, 2025

(30) Foreign Application Priority Data
Dec. 14, 2021 (AU) ................................ 2021904052

(51) Int. Cl.
*A01K 27/00* (2006.01)
*A01K 11/00* (2006.01)
(52) U.S. Cl.
CPC ......... *A01K 27/009* (2013.01); *A01K 11/008* (2013.01)
(58) Field of Classification Search
CPC .. A01K 27/009; A01K 11/008; A01K 15/021;

A01K 15/029; A01K 27/001; A01K 29/00; A01K 15/023; A01K 15/028; A01K 29/005; H05C 1/04; H03K 3/72
USPC ...................................................... 340/573.3
See application file for complete search history.

(56) References Cited

U.S. PATENT DOCUMENTS

| | | | |
|---|---|---|---|
| 6,581,546 B1 | 6/2003 | Dalland et al. | |
| 2004/0108939 A1 | 6/2004 | Giunta | |
| 2010/0050955 A1* | 3/2010 | Pacheco | A01K 27/009 |
| | | | 119/719 |
| 2010/0156643 A1* | 6/2010 | Gillis | A01K 15/021 |
| | | | 340/573.3 |

(Continued)

FOREIGN PATENT DOCUMENTS

| | | |
|---|---|---|
| AU | 2020200530 A1 | 4/2020 |
| WO | 2018152593 A1 | 8/2018 |
| WO | 2019180623 A1 | 9/2019 |

OTHER PUBLICATIONS

International Search Report and Written Opinion issued in International Application PCT/IB2022/062172 on Mar. 28, 2023 (12 pages).

*Primary Examiner* — Omar CasillasHernandez
(74) *Attorney, Agent, or Firm* — MH2 Technology Law Group, LLP

(57) ABSTRACT

The present invention relates to moving animals to a new location. More particularly but not exclusively, it relates a wearable device to send a stimulus to guide an animal from an initial location to a target location, where the journey between the two locations comprises a path that the animal may be hesitant to transit, and adjusting the stimulus accordingly.

21 Claims, 6 Drawing Sheets

(56)         References Cited

U.S. PATENT DOCUMENTS

| | | |
|---|---|---|
| 2013/0008391 A1 | 1/2013 | Berntsen |
| 2015/0040839 A1* | 2/2015 | Goetzl ................. A01K 15/021 |
| | | 119/720 |
| 2017/0135315 A1 | 5/2017 | Marmen et al. |
| 2021/0045353 A1* | 2/2021 | Ehrman ............... A01K 15/023 |

\* cited by examiner

APPARATUS TO GUIDE ANIMALS AND METHOD THEREFOR

CROSS-REFERENCE TO RELATED APPLICATIONS

This application is a U.S. National Stage of International Patent Application No. PCT/IB2022/062172, filed on Dec. 14, 2022, pending, and claims priority to Australian Patent Application No. 2021904052, filed on Dec. 14, 2021, both of which are incorporated herein by reference in their entireties.

The present invention relates to moving animals to a new location. More particularly but not exclusively, it relates a wearable device to send a stimulus to guide an animal from an initial location to a target location, where the journey between the two locations comprises a path that the animal may be hesitant to transit, and adjusting the stimulus accordingly.

BACKGROUND OF THE INVENTION

Guiding of animals, in particular to animals such as beef or dairy cattle between two locations using a wearable apparatus that is capable of administering a stimulus is known. An example of this technology is described in the PCT application WO2019180623A1 by Halter USA Inc. An issue with this technology is that cattle may find it difficult to be guided to be moved to a different area than the rest of the herd. For example it may be difficult to draft one animal or a few animals away from their herd using this technology.

Other methods of separating or drafting animals away from the herd are by using automated drafting gates that may read an animal identification tag and can control which exit the animal leaves depending on a predetermined program or choice relating to the animals identification tag. A commercial example is Protrack® Draft by AllFlex Ltd.

OBJECT OF THE INVENTION

It is an object of the present invention to system and method for improving the guidance of animals or at least partially ameliorates some of the abovementioned disadvantages or which at least provides the public with a useful choice.

SUMMARY OF THE INVENTION

In a first aspect, the invention resides in a wearable device configured to be worn by an animal, the device configured to guide the animal to a target location, the device comprising:
   at least one sensor configured to measure:
      position data of the wearable device;
   at least one stimulus device configured to:
      apply stimuli to the animal wherein the stimuli comprises a plurality of stimulus modes including a high pressure stimulus mode (second or firm mode) and a low pressure (first or gentle mode) stimulus mode;
   a controller configured to:
      receive data defining a target location,
      receive the position data of the wearable device,
      select the stimulus mode based on the position data of the wearable device, and
      operate the stimulus device to guide the animal to the target location according to:
         the selection of the stimuli mode; and
         a guidance mode.

In a second first aspect, the invention resides in a wearable device configured to be worn by an animal, the device configured to guide the animal to a target location, the device comprising:
   a sensor configured to measure:
      location position data of the wearable device;
   at least one stimulus device configured to:
      apply stimuli to the animal wherein the stimuli comprises a plurality of stimulus modes including a high pressure stimulus mode (second or firm mode) and a low pressure (first or gentle mode) stimulus mode;
      a controller configured to execute a closed loop control strategy comprising:
         applying a stimuli to the animal based on:
            a desired animal heading and animal location relative to one or more geographical features proximate the animal; and
            a stimuli mode selected based on the proximity to said features;
         determining an animal speed and heading from the position data following application of the stimuli; and
         altering the stimuli based on the determination of animal speed and heading.
   Wherein the below embodiments relate to any of the previous or following aspects.

In one embodiment, the position data comprises data derived from an animal location sensor and/or an animal position sensor, and the position data comprises one or more of animal location data, animal heading data, animal speed data, or animal angular position data.

Stimuli Mode Selection Criteria

In one embodiment, the guidance mode comprises control criteria determined by the stimuli mode.

In one embodiment, the controller is further configured to select the stimuli mode based on data indicating a measure difficulty for the animal to reach the target location.

In one embodiment, the measure difficulty is based on one or more of, a geographical data determination, historic data, and/or a user input.

In one embodiment, the historic data comprises one or more of: wearable device location data, and animal activity data, including stimulus data indicative of an application of a stimulus to the animal due to an association with a virtual boundary.

In one embodiment, the geographical data determination comprises a measure of proximity of the wearable device to one or more geographical features.

In one embodiment, the controller is configured to store the location of historic location data indicating one or more of: a physical boundary or virtual boundary, and select the stimuli mode based on said historic data.

In one embodiment, the controller is configured to determine a measure of difficulty for a gentle mode from data indicating one or more of:
   close proximity to a herd of like animals or devices,
   moving away from the herd,
   a first or second encounter with a virtual boundary,
   a prior virtual boundary of a geographical area previously associated with the application of a stimulus to the animal;
   a virtual or physical gateway through a physical boundary; and/or
   a virtual gateway through a virtual boundary;
In one embodiment, the measure of difficulty for a firm mode is determined by data indicating one or more of:
   an encounter with a known virtual boundary, remoteness to a herd of like animals or devices, moving with the herd, a geographical area defined by the animal location and a paddock boundary;

a geographical area of or within an existing paddock, or virtual paddock; and/or a geographical area defining a raceway.

Guidance Programmes

In one embodiment, the controller is configured to determine speed data and/or heading data of the animal, and select the guidance mode based on comparison of the speed data and/or heading data to one or more thresholds.

In one embodiment, the controller is configured to reduce the angle of the heading tolerance threshold for the firm guidance mode, and/or the controller is configured to increase the angle of the heading tolerance threshold for the gentle guidance mode.

In one embodiment, the controller is further configured to select a stimuli mode based on one or more guidance modes, the stimuli modes for each guidance mode comprising the application one or more of vibration, sound, and/or shock stimulus.

[Forward Angle—Control]

In one embodiment, the controller is configured to determine a difference between the animal heading and a target heading is outside of a predetermined heading tolerance threshold, then:

execute a first guidance mode comprising operating the stimulus device to the appropriate side operable to guide the animal heading toward the desired target heading.

In one embodiment, the controller is further configured to determine a duration of time the animal is moving outside of the heading tolerance threshold, and apply a first stimuli when a first threshold duration is exceeded, and apply further stimuli when a second threshold duration is exceeded.

In one embodiment, the controller is further configured to determine if the animal is headed outside of the heading tolerance threshold, and apply a first stimuli, the first stimuli being a sound.

In one embodiment, the controller is further configured to determine the animal is moving outside of the heading tolerance threshold, and apply a first stimuli for a time duration, and apply a further stimuli when a second time duration is exceeded.

In one embodiment, the further stimuli is a shock.

[Forward Angle—Firm]

In one embodiment, operational characteristics of the high pressure stimulus mode (firm mode) comprises one or more of:

the threshold angle of the forward angle is reduced, a sound is applied for a predetermined duration, a sound is applied with a increasing intensity, a sound is applied with a increasing frequency, applying a sound with a ramping intensity over time, applying a sound with a ramping intensity over time that ramps slower than the equivalent gentle mode, applying a sound with a ramping intensity over time that ramps to maximum intensity within seconds, a sound is applied with an intensity which increases proportionally to an increased heading value outside of the heading tolerance threshold; and/or a sound is applied with an intensity which increases proportionally to the duration of time the animal is outside of the heading tolerance threshold.

In one embodiment, in the high pressure stimulus mode the first stimuli is a sound with a ramping intensity over time that ramps slower than the equivalent gentle mode.

In one embodiment, the operational characteristics comprise a first stimulus applied after a first time duration has elapsed and the difference between the animal heading and a target heading is outside of a predetermined heading tolerance threshold.

In one embodiment, the first time duration is between 0 and 5 seconds.

In one embodiment, the first stimulus is a sound applied at a moderate strength 3 seconds or until the animal heading is inside the heading tolerance threshold.

In one embodiment, the operational characteristics comprise a second stimulus applied after a second, greater time duration has elapsed and the animal is still outside the heading tolerance threshold.

In one embodiment, the second stimulus is a shock.

[Forward Angle—Gentle]

In one embodiment, operational characteristics of the low pressure stimulus mode (gentle mode) comprises one or more of:

delaying the first and/or second stimulus application time after a determination the animal heading is outside the tolerance threshold, wherein the delay time is at least 2 seconds and/or wherein the second stimulus is applied at least 5 seconds after the first stimulus;

increasing the predetermined heading tolerance threshold;

decreasing the intensity of the stimulus type or stimulus application energy or stimulus application frequency;

applying a sound stimulus at Incrementally increasing volumes;

applying a sound with a ramping intensity over time, applying a sound with a ramping intensity over time that ramps faster than the equivalent firm mode, applying a sound with a ramping intensity over time that ramps to maximum intensity within 15 seconds, and/or omitting at least one stimulus output from a predetermined pattern of stimulus outputs compared to the high pressure stimulus mode.

In one embodiment, in the low pressure stimulus mode the first stimuli is a sound with a ramping intensity over time that ramps faster than the equivalent high pressure stimulus mode.

In one embodiment, in the low pressure stimulus mode the first stimuli is a sound that is applied instantly after the heading threshold tolerance has been exceeded.

In one embodiment, the first stimulus (of both the low pressure stimulus mode and high pressure stimulus mode) is applied to a side of the animal that is further away from the target heading, in order to guide the animal towards the target location.

In one embodiment, the first stimulus is a directional stimulus configured to direct the animals to the target location.

[Shove—Control]

In one embodiment, the controller is configured to determine a difference between the animal heading and a target heading is within a heading tolerance threshold, and determine the animal speed is below a low speed threshold, then:

execute a second guidance mode operable to encourage movement of the animal based on the selected stimuli mode.

[Shove—Firm]

In one embodiment, operational characteristics of the high pressure stimulus mode of the second guidance mode comprises one or more of:

the low speed threshold speed is up to 250 mm/s;

delaying the application of at least a first stimulus from when the low speed threshold is met wherein the delay is about 10 seconds, delaying the application of at least a first stimulus from when the low speed threshold is met, wherein the delay is about 10 seconds for an animal determined to be in a herd size or 80-150, and about 15 seconds for an animal determined to be in a herd size of 200 or more;

delaying the application of at least a first stimulus based on the determined location of the animal;

application of a the first stimulus being a sequence of pulsing vibrations;

application of a sequence of pulsing vibrations;

application of a sequence of pulsing vibrations for a predetermined duration, then application of a secondary stimulus type including a shock or a sound stimulus type;

application of a sequence of pulsing vibrations for a predetermined duration, the pulsing vibrations comprise vibrating for a duty of about 50% for a period of about one second;

application of a sequence of pulsing vibrations for a predetermined duration, the pulsing vibrations comprise vibrating for a duty of about 30-70% for a period of about 0.5 to 2 seconds; and/or application of a sequence of pulsing vibrations for a predetermined duration, the pulsing vibrations are applied for a duration of up to 10 seconds.

[Shove—Gentle]

In one embodiment, operational characteristics of the low pressure stimulus mode (gentle mode) of the second guidance mode comprises one or more of:

the low speed threshold activation speed is the same as a the high pressure stimulus mode low speed threshold activation speed;

the low speed threshold activation speed is slower than a the high pressure stimulus mode low speed threshold activation speed;

the low speed threshold activation speed is up to 100 mm/s;

applying delaying the application of a first vibration stimulus after a time delay;

applying a delaying the application of the first vibration stimulus for a time duration longer than the high pressure stimulus mode firm mode, wherein applying the first vibration stimulus is as a sequence of pulsing vibrations for a predetermined duration;

applying the first vibration stimulus type for a predetermined duration;

applying the first vibration stimulus type for a predetermined duration, wherein the predetermined duration of the first vibration stimulus type is longer than in the high pressure stimulus firm mode;

applying delaying the application of at least a second stimulus type after a time delay, wherein the second stimulus type is a shock or sound;

applying a first vibration stimulus or second stimulus after a time delay, wherein the time delay of either first vibration stimulus and or second stimulus type is about 30 seconds applying a first vibration stimulus and second stimulus after a time delay, wherein the second stimulus is subsequent the end of application of the first stimulus; and/or

applying a first vibration stimulus and second stimulus after a time delay, wherein the vibration stimulus type has a longer duration compared to the high pressure stimulus mode.

[Vibe—Control]

In one embodiment, the controller is configured to determine a difference between the animal heading and a target heading is within a heading tolerance threshold, and determine the animal speed is below a low speed threshold, then:

execute a third guidance mode operable to encourage the animal to accelerate based on the selected stimuli mode.

[Vibe—Firm]

In one embodiment, operational characteristics of the high pressure stimulus mode of the third guidance mode comprises one or more of:

applying a vibration stimulus;

applying a vibration stimulus until a high speed threshold of the device is reached;

wherein the high speed threshold is the same as the low speed threshold;

stopping the vibration stimulus when the controller determines the animal speed is above the high speed threshold;

applying a vibration stimulus with incrementally decreasing intensity;

applying a vibration stimulus with an intensity varying between a maximum intensity for a determined a low speed, to a minimum intensity for a predetermined higher speed;

applying a vibration stimulus with intensity inversely proportional to a determined increase animal speed;

applying a vibration stimulus with frequency inversely proportional to a determined increase animal speed;

applying a vibration stimulus with a ramping intensity over time, applying a vibration stimulus with a ramping intensity over time that ramps slower than the equivalent high pressure stimulus firm mode, applying a vibration stimulus for a predetermined time duration, and/or wherein the predetermined time duration is 15 seconds.

[Vibe—Gentle]

In one embodiment, operational characteristics of the low pressure stimulus mode of the third guidance mode comprises one or more of:

applying a vibration stimulus after a predetermined delay duration has elapsed since the heading threshold was met and optionally the device speed low threshold was met;

applying a vibration stimulus after a predetermined delay duration has elapsed since the heading threshold was met and optionally the device speed low threshold was met, with an intensity less than that of the high pressure stimulation mode;

wherein the delay duration is between 1 and 500 seconds;

wherein the delay duration is 30 seconds.

applying a vibration stimulus for a period of time which is less than that of the high pressure stimulation mode when no change in speed is determined;

applying a vibration stimulus with a ramping intensity over time, wherein the predetermined time duration is over 15 seconds, and/or applying a vibration stimulus which increases in intensity though at least part of the application duration.

In one embodiment, the second guidance mode is activated by the controller directly after the stimulus of the third guidance mode have stopped being applied, where the controller has determined the animal heading and a target heading is still within a heading tolerance threshold, and determined the animal speed is still below the low speed threshold.

In one embodiment, the heading tolerance threshold is 75 degrees in the low pressure stimulus mode.

[Shock Lock-Out—Control]

In one embodiment, the controller is configured to:
determine the stimulus device has met one or more operational characteristics, and
disable further shock energy delivery for a predetermined shock time period.

[Shock Lock Out—Firm]

In one embodiment, operational characteristics of the high pressure stimulus mode (firm mode) of the fifth guidance mode comprises one or more of:
determining the exceeding of a threshold for shock delivery quantity in a predetermined time duration, or a shock energy measure;
wherein the threshold is between 5 and 15 shocks;
wherein the threshold of shocks is about 5 shocks;
wherein the predetermined time period is about 5 minutes;
wherein the predetermined time period is between 1 and 20 minutes;
determining the animal has moved a distance greater than a distance threshold;
wherein the distance threshold is 5 metres;
determining the animal is moving at a speed greater than a speed threshold;
wherein the speed threshold is at least 500 mm/s; and/or,
wherein if the time period elapsed from operating the stimulus device to guide the animal to the target location exceeds a threshold time period, then the mode will revert from the firm mode to the gentle mode.

[Shock Lock Out—Gentle]

In one embodiment, operational characteristics of the low pressure stimulus mode (gentle mode) of the fifth guidance mode comprises one or more of:
determining the exceeding of a threshold for shock delivery quantity in a predetermined time duration, or a shock energy measure;
wherein the threshold is less than that of the high pressure stimulus mode;
wherein the total quantity of shocks is between between 2 and 5 shocks, preferably 3 shocks;
wherein the time duration is longer than that of the high pressure stimulus mode;
wherein the time duration is about 8 minutes;
wherein the time duration is between 1 and 20 minutes;
ending or resetting the fifth guidance mode when a total time has elapsed;
wherein the total time is about 30 minutes;
determining an animal speed is at least a target speed, then, ending or resetting the fifth guidance mode; and/or,
wherein the target speed is at least 600 mm/s.

In a third aspect the invention broadly consists of a wearable device configured to be worn by an animal, the device configured to guide the animal to a target location, the device comprising:
at least one sensor configured to measure location position data of the wearable device;

at least one stimulus device configured to apply stimuli to the animal wherein the stimuli comprises a plurality of stimulus modes including a high pressure stimulus mode (firm mode) and a low pressure (gentle mode) stimulus mode; and
a controller configured to:
receive data defining a target location,
receive the position data of the wearable device,
select the stimulus mode based on the position data of the wearable device, and
operate the stimulus device to guide the animal to the target location according to:
the selection of the stimuli mode; and
a guidance mode,
to select the stimuli mode based on data indicating a measure difficulty for the animal to reach the target location, where the measure of difficulty:
for the gentle mode is determined by data indicating a prior virtual boundary of a geographical area that previously bound, deterred, restrained, or was used as the basis of a stimulus for the animal;
for the firm mode is determined by data indicating a geographical area of or within an existing paddock, or virtual paddock;
to determine a difference between the animal heading and a target heading relative a heading tolerance threshold, and determine the animal speed relative a low speed threshold, then:
execute a guidance mode operable to encourage movement of the animal based on the selected stimuli mode Instant Piezo In one embodiment, the controller is configured to determine a difference between the animal heading and a target heading is outside of a predetermined heading tolerance threshold, then execute a first guidance mode comprising operating the stimulus device to the appropriate side operable to guide the animal heading toward the desired target heading.

In one embodiment, the controller is further configured to determine if the animal is headed outside of the heading tolerance threshold, and apply a first stimuli, the first stimuli being a sound.

In one embodiment, in the high pressure stimulus mode the first stimuli is a sound with a ramping intensity over time that ramps slower than the equivalent low pressure stimulus mode.

Delayed Vibe

In one embodiment, the controller is configured to determine a difference between the animal heading and a target heading is inside of a predetermined heading tolerance threshold and determine the animal speed is below a low speed threshold, and wherein the controller is configured to execute a third guidance mode operable to encourage the animal to accelerate based on the selected stimuli mode.

In one embodiment, operational characteristics of the high pressure stimulus mode of the third guidance mode comprises applying a vibration stimulus with a ramping intensity over time as soon as the heading tolerance threshold is met, and the operational characteristics of the low pressure stimulus mode of the third guidance mode comprises applying a vibration stimulus with a ramping intensity over time after a delay of time from when the heading tolerance threshold is met.

In one embodiment, the vibration stimulus with a ramping intensity stops after a time period; if the heading tolerance threshold is not met, and/or the animal speed is below a low speed threshold.

Shove

In one embodiment, the controller is configured to determine a difference between the animal heading and a target heading is within a heading tolerance threshold, and determine the animal speed below a low speed threshold, then execute a second guidance mode operable to encourage movement of the animal based on the selected stimuli mode.

In one embodiment, operational characteristics of the second guidance mode for the:

firm mode comprises application of a sequence of pulsing vibrations via the stimulus device for a predetermined duration, then application of a secondary stimulus type including a shock or a sound stimulus type;

gentle mode comprises delaying the application a sequence of pulsing vibrations for a predetermined duration from when the heading tolerance threshold is met.

In one embodiment, the second guidance mode stimulus are activated after the third guidance mode stimulus have stopped.

In one embodiment, the target location is outside of the prior virtual boundary of a geographical area that previously bound, deterred, or restrained the animal previously.

In one embodiment, the prior virtual boundary of a geographical area that previously bound, deterred, or restrained the animal was enforced by the device.

In a fourth aspect the invention broadly consists of a wearable device configured to be worn by an animal, the device configured to guide the animal to a target location, the device comprising:

at least one sensor configured to measure heading and speed data of the wearable device;

at least one stimulus device operable to apply a stimulus to the animal including the application of one or more of vibration stimulus; and a controller configured to:

receive data defining a heading and speed of the wearable device, determine a difference between the heading and a target heading is within a heading tolerance threshold, and determine the wearable device is below a low speed threshold, apply a vibration stimulus to the animal until the controller determine the wearable device is moving above a high speed threshold.

In one embodiment, the vibration stimulus is a pulsed vibration.

In a fifth aspect the invention broadly consists of a wearable device configured to be worn by an animal, the device configured to guide the animal along a target heading to a target location, the device comprising:

a. at least one sensor configured to measure position data of the wearable device;

b. at least one stimulus device operable to apply stimulus to the animal including the application of one or more of vibration, sound, and/or shock stimulus operable to elicit a level of behavioural response from the animal;

c. a controller configured to:

i) receive data defining the target location, ii) receive the position data of the wearable device, iii) operate the stimulus device according to one of a plurality of stimulus modes of the stimulus device including:

a "first" stimulus mode, and a "second" stimulus mode, the second stimulus mode comprising stimuli operable to elicit a stronger level behavioural response than the first stimulus mode;

iv) guide the animal to the target location according to a selection of:

the stimuli mode based on the position data of the wearable device, and a guidance mode;

v) select the first stimulus mode when position data is received indicating the animal is approaching or within a predefined area defined by an area comprising a virtual fencing boundary or gate that historically activated the stimulus device to stimulate the animal, vi) select the second stimulus mode when position data is received indicating the animal is approaching or within a predefined area defined by an area paddock which the animal was free to move within without prior historical stimulus applications from the stimulus device.

In one embodiment, the controller is configured to determine via the position data that the animal heading is inside or outside a heading tolerance threshold, the heading tolerance threshold defined by an angle either side of the target heading.

In one embodiment, the controller in the low pressure stimulus mode is configured to comprise a heading tolerance threshold of more than 30 degrees either side of a target heading, and if the animal heading is outside said heading tolerance threshold, apply a sound stimulus is applied for a first time duration after the animal is detected as being outside the heading tolerance threshold for a second time duration, and apply a shock stimulus if the animal continues to head outside said heading tolerance threshold after said first time duration and second time duration have ended.

In one embodiment, the controller in the high pressure stimulus mode is configured to comprise a heading tolerance threshold of less than 30 degrees either side of a target heading, and if the animal heading is outside said heading tolerance threshold immediately apply a sound stimulus for a first time duration once the animal is detected as being outside the heading tolerance threshold, and immediately apply a shock stimulus if the animal continues to head outside said heading tolerance threshold after said first time duration has ended.

In one embodiment, the first stimulus of both the low pressure stimulus mode and high pressure stimulus mode is applied to a side of the animal that is further away from the target heading, in order to guide the animal towards the target location.

In one embodiment, the first time duration for the low pressure stimulus mode is greater than the first time duration for the high pressure stimulus mode.

In one embodiment, the first time duration for the low pressure stimulus mode is 10 seconds and the high pressure stimulus mode first time duration is 6 seconds.

In one embodiment, the sound level is increasingly ramped over the first time period.

In a sixth aspect the invention broadly consists of a wearable device configured to be worn by an animal wearable device configured to be worn by an animal, the device configured to guide the animal to a target location, the device comprising:

at least one sensor configured to measure position data of the wearable device;

at least one stimulus device operable to apply stimuli to the animal including the application of one or more of vibration, sound, and/or shock stimulus operable to elicit a level of behavioural response from the animal;

a controller configured to:

receive data defining the target location, receive the position data of the wearable device, operate the stimulus device according to one of a plurality of stimulus modes of the stimulus device including:

a "first" stimulus mode, and a "second" stimulus mode, the second stimulus mode comprising stimuli operable to elicit a stronger level behavioural response than the first stimulus mode;

guide the animal to the target location according to a selection of:

the stimuli mode based on the position data of the wearable device, and a guidance mode.

In some embodiments, the position data comprises data derived from an animal location sensor and/or an animal position sensor, and the position data comprises one or more of animal location data, animal heading data, animal speed data, or animal angular position data.

In some embodiments, the controller is configured to select the stimulus mode based on one or more of: a geographical data determination, historic data, and a user input.

In some embodiments, the historic data comprises one or more of: wearable device location data, and animal activity data, including stimulus data indicative of an application of a stimulus to the animal due to an association with a virtual boundary.

In some embodiments, the geographical data determination comprises a measure of proximity of the wearable device to one or more geographical features.

In some embodiments, the controller is configured to store the location of historic location data indicating one or more of: a physical boundary or virtual boundary, and select the stimulus mode based on said historic location data.

In some embodiments, the controller is configured to select the first stimulus mode based on the determination or receipt of data indicative of the device:

being outside a threshold distance to a threshold number of wearable devices worn by other animals;

approaching a virtual boundary for the first or second time;

approaching a historical virtual boundary of a geographical area previously associated with the application of a stimulus to the animal;

approaching a virtual or physical gateway through a physical boundary;

within any predefined geographical area indicated as a low pressure stimulus mode area; and/or approaching a virtual gateway through a virtual boundary.

In some embodiments, the controller is configured to select the second stimulus mode based on the determination or receipt of data indicative of the device:

approaching a known virtual boundary;

being within a threshold distance to a threshold number of similar devices;

being within a geographical area defined by a virtual or physical paddock boundary;

being within any predefined geographical area indicated as a high pressure stimulus mode area, and/or being within a geographical area defining a raceway.

In some embodiments, the controller is configured to determine animal speed data and/or animal heading data, and select the guidance mode based on comparison of the speed data and/or heading data to one or more thresholds.

In some embodiments, the controller is configured to determine via the position data that the animal heading is within or outside a heading tolerance threshold, the heading tolerance threshold defined by an angle either side of a target heading, the target heading extending between the animal location and the target location.

In some embodiments, the heading tolerance threshold for the second stimulus mode is narrower than the first stimulus mode.

In some embodiments, the controller is configured to select the stimulus mode based on the selection of one or more guidance modes.

In some embodiments, the controller is configured to:

determine a difference between the animal heading and a target heading is outside of a predetermined heading tolerance threshold, then:

execute a first guidance mode comprising operating the stimulus device to apply a stimulus to guide the animal heading toward the target heading or desired target location.

In some embodiments, the controller is configured to determine a duration of time the animal is heading outside of the heading tolerance threshold, and operate the stimulus device to apply a first stimulus when a first threshold duration is exceeded, and apply further stimulus when a second threshold duration is exceeded.

In some embodiments, the controller is further configured to determine if the animal is headed outside of the heading tolerance threshold, and apply the first stimulus, the first stimulus being a sound.

In some embodiments, the controller is further configured to determine the animal is headed outside of the heading tolerance threshold, and apply the first stimulus for a time duration, and apply a further stimulus when a second time duration is exceeded.

In some embodiments, the further stimulus is a shock.

In some embodiments, the controller, under the second stimulus mode of the first guidance mode, is configured to execute one or more of:

apply the first stimulus after a first time duration has elapsed since the difference between the animal heading and a target heading was outside of a predetermined heading tolerance threshold, apply the first stimulus for a predetermined duration shorter than the first stimulus mode, apply the first stimulus with an increasing intensity compared to the first stimulus mode, apply the first stimulus with an increasing frequency faster than compared to the first stimulus mode, apply the first stimulus with a increasing intensity over time, that increases faster compared to the first stimulus mode, apply the first stimulus with a increasing intensity over time that increases to maximum intensity within 10 seconds, apply the first stimulus with an intensity which increases proportionally to an increased heading value outside of the heading tolerance threshold, apply the first stimulus with an intensity which increases proportionally to a duration of time the animal is headed outside of the heading tolerance threshold, apply the further stimulus with intensity which is more intense compared to the first stimulus mode, and/or reduce the angle of the predetermined heading tolerance threshold.

In some embodiments, the first time duration is between 0 and 5 seconds.

In some embodiments, the first stimulus is a sound applied for 3 seconds or until the animal heading is inside the heading tolerance threshold.

In some embodiments, the controller under the second stimulus mode is configured to apply a second stimulus after a second, greater, time duration has elapsed and the animal is still outside the heading tolerance threshold.

In some embodiments, the second stimulus is a shock.

In some embodiments, the controller, under the first stimulus mode of the first guidance mode, is configured to execute one or more of:

delay the first and/or second stimulus application time after a determination the animal heading is outside the tolerance threshold, wherein the delay time is at least 2 seconds and/or wherein the second stimulus is applied at least 5 seconds after the first stimulus;

increase the angle of the predetermined heading tolerance threshold compared to the second stimulus mode;

decrease the intensity of the stimulus type or stimulus application energy or stimulus application frequency compared to the second stimulus mode;

apply the first stimulus at incrementally increasing volumes;

apply the first stimulus with a increasing intensity over time, apply the first stimulus with a increasing intensity over time that increases faster than equivalent first stimulus under the second stimulus mode, apply the first stimulus with a increasing intensity over time that increases to maximum intensity within 15 seconds, and/or omit at least one of the first or second stimulus from a predetermined pattern of stimulus compared to the second stimulus mode.

In some embodiments, the first stimulus is a sound with an increasing intensity over time that increases faster than the second stimulus mode.

In some embodiments, the first stimulus is a sound that is applied instantly after the heading threshold tolerance has been exceeded, and the sound is applied to a side of the animal angled furthest from the target heading.

In some embodiments, the heading tolerance threshold is 45 degrees or more in the first stimulus mode, and less than 45 degrees in the second stimulus mode.

In a seventh aspect, the invention consists in a wearable device configured to be worn by an animal, the device configured to guide the animal to a target location, the device comprising:

at least one sensor configured to measure location position data of the wearable device;

at least one stimulus device operable to apply stimuli to the animal including the application of one or more of vibration, sound, and/or shock stimulus operable to elicit a level of behavioural response from the animal; and a controller configured to:
receive data defining the target location,
receive the position data of the wearable device,
operate the stimulus device according to one of a plurality of stimulus modes of the stimulus device including:
a "first" stimulus mode, and a "second" stimulus mode, the second stimulus mode comprising stimuli operable to elicit a stronger level behavioural response than the first stimulus mode;

guide the animal to the target location according to a selection of:
the stimuli mode based on the position data of the wearable device, and a guidance mode;
select the stimulus mode based on data, where.
the first stimulus mode is determined by data indicating the target location requires the animal crossing a prior virtual boundary of a geographical area that previously bound, deterred, restrained, or was used as the basis of a stimulus for the animal;
the second stimulus mode is determined by data indicating the target location requires the animal moving within a geographical area of or within an existing paddock or area of a paddock, physically or virtually bound;
determine a difference between the animal heading and a target heading relative a heading tolerance threshold, and determine the animal speed relative a low speed threshold, and if outside one or both of the heading tolerance threshold and speed threshold then:
execute a guidance mode operable to encourage movement of the animal based on the selected stimulus mode.

In some embodiments, the heading tolerance threshold and/or speed threshold for the second stimulus mode is narrower than the first stimulus mode.

In some embodiments, the controller is configured to determine if a difference between the animal heading and a target heading is outside of a predetermined heading tolerance threshold, then execute a first guidance mode comprising operating the stimulus device to the appropriate side operable to guide the animal heading toward the desired target heading.

In some embodiments, the controller is further configured to determine if the animal is headed outside of the heading tolerance threshold, and apply a first stimulus, the first stimulus being a sound, and the sound being applied to a side of the animal angled furthest from the target heading.

In some embodiments, in the second stimulus mode, the first stimulus is a sound with an increasing intensity over time that increases slower than the first stimulus mode.

In some embodiments, the controller is configured to determine a difference between the animal heading and a target heading is inside of a predetermined heading tolerance threshold and determine the animal speed is below a low speed threshold, and wherein the controller is configured to execute a third guidance mode operable to encourage the animal to accelerate based on the selected stimulus mode.

In some embodiments, the controller, under the second stimulus mode of the third guidance mode, is configured to execute applying a vibration stimulus with an intensity increasing over time when the heading tolerance threshold is met, and/or under the second stimulus mode of the third guidance mode, is configured to apply a vibration stimulus with a increasing intensity over time after a delay of time from when the heading tolerance threshold is met.

In some embodiments, the vibration stimulus with an increasing intensity stops after a time period; if the heading tolerance threshold is not met, and/or the animal speed is below a low speed threshold.

In some embodiments, the controller is configured to determine a difference between the animal heading and a target heading is within a heading tolerance threshold, and determine the animal speed below a low speed threshold, then: execute a second guidance mode operable to encourage movement of the animal based on the selected stimulus mode.

In some embodiments, the controller under the second guidance mode is configured to:

for the second stimulus, mode apply an application of a sequence of pulsing vibrations via the stimulus device for a predetermined duration, then application of a secondary stimulus type including a shock or a sound stimulus type;

for the first stimulus mode, delaying the application a sequence of pulsing vibrations for a predetermined duration from when the heading tolerance threshold is met.

In some embodiments, the second guidance mode stimulus are activated after the third guidance mode stimulus have stopped.

In some embodiments, the target location is outside of the prior virtual boundary of a geographical area that previously bound, deterred, or restrained the animal previously.

In some embodiments, the prior virtual boundary of a geographical area that previously bound, deterred, or restrained the animal was enforced by the device.

In some embodiments, the heading tolerance threshold is reduced in angle for the second guidance mode.

In some embodiments, the heading tolerance threshold is increased in angle for the first guidance mode.

In an eighth aspect the invention consists in a wearable device configured to be worn by an animal, the device configured to guide the animal to a target location, the device comprising:

at least one sensor configured to measure heading and speed data of the wearable device;

at least one stimulus device operable to apply a stimulus to the animal including the application of one or more of vibration stimulus; and a controller configured to:

receive data defining a heading and speed of the wearable device, determine a difference between the heading and a target heading is within a heading tolerance threshold, and determine the wearable device is below a low speed threshold, apply a vibration stimulus to the animal until the controller determines the wearable device is moving above a high speed threshold.

In some embodiments, the vibration stimulus is a pulsed vibration.

In a ninth aspect, the invention consists in a wearable device configured to be worn by an animal, the device configured to guide the animal along a target heading to a target location, the device comprising:

at least one sensor configured to measure position data of the wearable device;

at least one stimulus device operable to apply stimulus to the animal including the application of one or more of vibration, sound, and/or shock stimulus operable to elicit a level of behavioural response from the animal;

a controller configured to:

i. receive data defining the target location, ii. receive the position data of the wearable device, iii. operate the stimulus device according to one of a plurality of stimulus modes of the stimulus device including:

a "first" stimulus mode, and a "second" stimulus mode, the second stimulus mode comprising stimuli operable to elicit a stronger level behavioural response than the first stimulus mode;

iv. guide the animal to the target location according to a selection of:

the stimuli mode based on the position data of the wearable device;

v. select the first stimulus mode when position data is received indicating the animal is approaching or within a predefined area defined by an area comprising a virtual fencing boundary or gate that historically activated the stimulus device to stimulate the animal, vi. select the second stimulus mode when position data is received indicating the animal is approaching or within a predefined area defined by an area paddock which the animal was free to move within without prior historical stimulus applications from the stimulus device.

In some embodiments, the controller is configured to determine via the position data that the animal heading is inside or outside a heading tolerance threshold, the heading tolerance threshold defined by an angle either side of the target heading.

In some embodiments, the controller in the first stimulus mode is configured to comprise a heading tolerance threshold of more than 30 degrees either side of a target heading, and if the animal heading is outside said heading tolerance threshold, apply a sound stimulus is applied for a first time duration after the animal is detected as being outside the heading tolerance threshold, and apply a shock stimulus if the animal continues to head outside said heading tolerance threshold after said first time duration has ended.

In some embodiments, the controller in the second stimulus mode is configured to comprise a heading tolerance threshold of less than 30 degrees either side of a target heading, and if the animal heading is outside said heading tolerance threshold apply a sound stimulus for a first time duration once the animal is detected as being outside the heading tolerance threshold, and apply a shock stimulus if the animal continues to head outside said heading tolerance threshold after said first time duration has ended.

In some embodiments, the first stimulus of both the first stimulus mode and second stimulus mode is applied to a side of the animal that is further away from the target heading, in order to guide the animal towards the target location.

In some embodiments, the first time duration for the first stimulus mode is greater than the first time duration for the second stimulus mode.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, a reference to such external documents is not to be construed as an admission that such documents, or such sources of information, in any jurisdiction, are prior art, or form part of the common general knowledge in the art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary.

It is also to be understood that the specific devices illustrated in the attached drawings and described in the following description are simply exemplary embodiments of the invention. Hence, specific dimensions and other physical characteristics related to the embodiments disclosed herein are not to be considered as limiting.

It is acknowledged that the term "comprise" may, under varying jurisdictions, be attributed with either an exclusive or an inclusive meaning. For the purpose of this specification, and unless otherwise noted, the term 'comprise' shall have an inclusive meaning, allowing for inclusion of not only the listed components or elements, but also other non-specified components or elements. The terms 'comprises' or 'comprised' or 'comprising' have a similar meaning when used in relation to the system or to one or more steps in a method or process.

As used hereinbefore and hereinafter, the term "and/or" means "and" or "or", or both.

As used hereinbefore and hereinafter, "(s)" following a noun means the plural and/or singular forms of the noun.

When used in the claims and unless stated otherwise, the word 'for' is to be interpreted to mean only 'suitable for', and not for example, specifically 'adapted' or 'configured' for the purpose that is stated.

For the purpose of this specification, where method steps are described in sequence, the sequence does not necessarily mean that the steps are to be chronologically ordered in that sequence, unless there is no other logical manner of interpreting the sequence.

The entire disclosures of all applications, patents and publications, cited above and below, if any, are hereby incorporated by reference.

BRIEF DESCRIPTION OF THE DRAWINGS

Preferred embodiments of the invention will be described by way of example only and with reference to the drawings, in which.

DETAILED DESCRIPTION

Figures 1, 2:
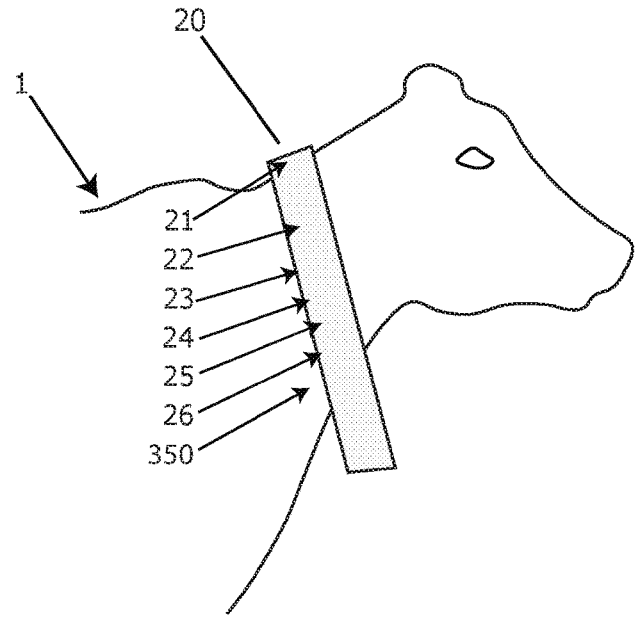
FIG. 1: shows a schematic view of a system, user and animal.
FIG. 2: shows a side view of a wearable device on an animal.

With reference to the above drawings, in which similar features are generally indicated by similar numerals, FIG. 1 illustrates a general system according to a first preferred embodiment of the invention and is generally indicated by the numeral 18 and adapted for animal guidance. The present invention comprises a wearable device 20 configured to be worn by an animal 1. Such an animal 1 may be any of dogs, pets, dairy cows, beef animals, bovidae, goat, bison, sheep, bull, lama or any other animal that is desired to be 'moved', 'shifted', 'drafted', and/or 'guided' from an initial location (such as a current location) to a target location. The invention is particularly useful to cattle that primarily feed on pasture or crops within paddocks. The animal 1 may form part of a herd of animals where one or more animals 1 in the herd wear a device 20. In this specification, the wearable device is implemented as a collar, i.e. for placement around the neck of an animal. Many placements and appropriate implementations are possible and the most suitable location will be dependent on the particular animal and environment for use.

The wearable device 20 utilises technology by the company HALTER® and is further described in patent publications WO2019180624 and WO2019180623. The HALTER® technology is capable of restraining an animal in a paddock defined by a virtual boundary, as well as being able to shift the animal from one location to another such as from a paddock to a milking shed. The wearable device 20 achieves this via administering audible signals to the left and/or right ears of the animal 1, and/or in combination with administering vibration and/or electrical stimulus to the animal 1. The wearable device 20 utilises electronics and/or software to control stimuli using control actions, as well as to communicate externally-such as to receive target locations, transition locations etc.

The herein described animal guidance functionality is provided by a control system which may herein be referred to as a controller. The controller is implemented by one or more computing devices which form the architecture of a system configured to perform desired functions. Reference to "controller" may refer to one or more electronic devices that are configured to directly or indirectly communicate with, or over, one or more networks. The computing device may be a mobile device. As an example, a mobile device may include a smart wearable device such as a wearable animal collar (or "collar"), a cellular phone, IoT capable device, smartphone, a portable computer, such as watches, glasses, lenses, clothing, and/or the like, and/or other like devices. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface.

Any or a selection of computing devices is configured to communicate with any other computing device as desired, where the terms "communication" and "communicate" may refer to the reception, receipt, transmission, transfer, provision, and/or the like of information, such as data, signals, messages, instructions, commands, and/or the like. For one controller, such as a device, a system, a component of a device or system, combinations thereof, and/or the like to be in communication with another controller means that the one controller is able to directly or indirectly receive information from and/or transmit information to the other controller. This may refer to a direct or indirect connection that is wired and/or wireless in nature. Additionally, two controllers may be in communication with each other even though the information transmitted may be modified, processed, relayed, and/or routed between the first and second controller. For example, a first controller may be in communication with a second controller even though the first unit passively receives information and does not actively transmit information to the second unit. As another example, a first controller may be in communication with a second controller and at least one intermediary controller, where a third controller is located between the first controller and the second controller, processes information received from the first controller and communicates the processed information to the second controller. In some non-limiting embodiments, data or information may refer to a network packet such as a data packet, and/or the like that includes data. It will be appreciated that numerous other arrangements are possible.

Further, in some embodiments, there is a central or master controller which may be referred to as a server, or generally as 'the controller'. The term server or controller may refer to or include one or more processors or computing devices, storage devices, or similar computer arrangements that are operated by or facilitate communication and processing for multiple parties in a network environment, although it will be appreciated that communication may be facilitated over one or more public or private network environments and that various other arrangements are possible. Further, multiple computers such as servers or other computerised devices, directly or indirectly communicating in the network environment may constitute the controller such as a computing device configured for central service control.

Reference to "a server" or "a processor," as used herein, may refer to a previously-recited server and/or processor that is recited as performing a previous step or function, a different server and/or processor, and/or a combination of servers and/or processors, and refer to general implementations of processors which form the functional elements of the controller. For example, a first server and/or a first processor that is recited as performing a first step or function may refer to the same or different server and/or a processor recited as performing a second step or function. Further, reference to a server or processor may refer to a group of servers or group of processors, each configured to perform a task. Such tasks may include processes or algorithms which are undertaken by one or more servers of processors. Tasks undertaken by any one or more processors, such as by an on-collar and/or off-collar processor, are therefore to be understood as tasks undertaken collectively by the controller or control system.

Embodiments of this disclosure include reference to cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Some embodiments are private clouds where the cloud infrastructure is operated solely for an organisation. Other embodiments are community clouds, where cloud infrastructure is shared by several organisations and supports a specific community that has shared concerns such as security requirements, policy, or compliance considerations. The community cloud may be managed by the organisations or a third party and may exist on-premises or off-premises. In some embodiments, a public cloud infrastructure is made available to the general public or a large industry group and is owned by an organisation selling cloud services. A cloud computing environment is service-oriented with a focus on statelessness, low coupling, modularity, and semantic interoperability.

At the heart of cloud computing is an infrastructure comprising a network of interconnected nodes. The cloud computing models may be managed by the organisation or a third party and may exist on-premises or off-premises. One applicable implementation model for the present disclosure is by Software as a Service (Saas). SaaS is the capability provided to the consumer to use the provider's applications running on a cloud infrastructure. The applications are accessible from various client devices through a client interface such as a web browser. The consumer does not typically manage or control the underlying cloud infrastructure including network, servers, operating systems, storage, or even individual application capabilities.

Non-limiting embodiments or aspects of the present invention are directed to a method and system for controlling functions of a wearable animal collar which are operable to direct an animal to a target location. Accordingly, some embodiments relate to an animal guidance system operable to guide the animal to a target location.

In some embodiments described herein, the wearable device comprises a controller configured to operate functions of the wearable device, and the wearable device communicates with a computing device operating as a controller configured to manage control of the wearable device. The animal guidance system has a wearable apparatus (collar) adapted to be worn by an animal as will be discussed in further detail below. However, the wearable apparatus has at least one stimulus device operable to administer at least one form of stimulus to the animal and guide the animal to the target.

The animal guidance system further has at least one positioning system configured to output animal position data and voiding target position data. The guidance system may be provided by a GPS device located on the wearable apparatus, or local positioning system. Many forms of the positioning system are possible, and some of which are discussed in further detail below.

The animal guidance system further has at least one animal activity sensing device configured to output animal activity data. Animal activity data typically includes data relating to the movement of an animal as defined by one or more sensors configured to generate a signal based on a change on any one or more degrees of freedom as may be desired. Further detail on animal activity data and interpretation of said data to indicate animal activity is discussed below.

The animal guidance system further has at least one controller module configured to undertake particular functional requirements. The specification below will discuss many functions in terms of desired outcomes, data and considerations to support those outcomes. It should be understood that for each outcome, the controller is configured to receive information, undertake any one or more functional steps based on the received information, and generate an output operable to achieve the stated outcome. For example, in some embodiments, the controller is configured to receive the animal position data, receive the animal activity data, determine animal behaviour information from the animal position data and/or animal activity data; and generate an output operable to control at least one stimulus device to administer the stimulus to guide the animal to a target location.

In some embodiments, the controller is made up of several discrete processing devices, such as microprocessors or other equivalent form of computing device. Further, those processing devices are distributed over a variety of locations, and may be interconnected as a network. The processing devices of the network are connected, preferably wirelessly. A wearable animal apparatus may for example have a processor configured to receive and act on data from the animal positioning system and animal activity device. That data may be communicated via the network to one or more other processing devices.

In some embodiments, one of the processing devices acts as a master device which connects to any number of other devices, collates data from any one of the number of other devices, makes decisions based on that collated data, then communicates instructions to any one or more of the other processing devices. For example, in some embodiments the controller has at least one master processing device connected to a number of other processing devices which are located on an animal wearable collar. In such embodiments, the master processing device acts as a first controller module part and the one or more on-collar processing devices acts as a second controller module part, the controller module parts acting together as the controller of the control system.

In some embodiments, functions of the controller are enabled according to a SaaS subscription status. In order for the animal to move to a target location, a controller configured to operate the wearable device (also herein called a collar) must determine or be supplied with the target location. As such, the controller must determine at least the animal location and a target location, and any other used variables to output to the stimulus device a stimulus or stimuli to suggest movement to the animal to the target location.

In the preferred embodiment, the controller onboard the wearable device is configured to receive a signal from an off-collar (off-wearable device) relating to the target location. In some embodiments, the target location comprises a destination at the end of a pathway or heading. In some embodiments, the path between the target location contains one or more waypoints where the animal is desired to either pass through or exhibit some kind of behaviour when nearby. The off-collar processor may be located in the cloud, a remote PC, or a user's computing device etc.

In other embodiments, the wearable device comprises the processor. In further embodiments, determination of the above information to be determined is on the processor of the wearable device, or on both the off-collar and on-collar processors. Within this specification, where calculations or determinations are required, it is assumed they are performed by the control system which comprises computation by an on-collar processor and/or an off-collar processor. For example, in some exemplary embodiments, activity and location information is determined by the on-collar processor, whereas the target location and stimulus controls may be determined by an off-collar processor. Other implementations are possible.

Control Infrastructure—Overview of Hardware and General Function

FIG. 1 is one example of a general communication system infrastructure diagram incorporating the features of the invention in an example where a position of a cow 1 in a field is being monitored and controlled. In this relatively simple example, a user 820 tracks the position of a cow 1 within a particular portion of the field and if deemed necessary or desirable, apply a desired form of stimulus to the cow 805 to thereby elicit a response from the animal, such as guiding the animal to a new location. The user 820 may use a software application (such as mobile app) on mobile device 830, which includes, or can receive information from, receivers capable of detecting signals originating from GPS satellites 840, WiFi repeater/booster stations 850, and one or more cell towers 860, as well as signal 870 originating from a collar 800 carried by the cow 1. By connecting with the Internet 865 via WIFI, Bluetooth, or cell transmissions such as 3G,4G, LTE etc., the software application may access the positional data (angular and/or locational positional data) stored on a remote server, such as cloud server 880. The data contained in the cloud server 880 can also be accessed by a processor of a computing device, such as a PC 890, via a connection through the Internet 865. The PC 890 or a user device (such as mobile device 830) comprises a user interface and/or server 880, and for some embodiments, is configured to perform the control action on the basis of a control command. Preferably, the processors of the control system are operatively connected to or are part of a user device such as a smartphone, PDA, PC, laptop or any other suitable user device.

The user 820 may monitor the result of the comparison performed by a processor that is either part of, or is operatively connected to the collar 20, on a screen of the mobile device 830, and depending upon the result of the comparison, the user 820 may send an appropriate control command to the controller. The control command may then be received by the collar processor which will then determine on the basis of the control command received as to whether a control action is required. If the collar processor determines from a control command that no stimulus is to be applied to the cow 1, then no control signal will be transmitted or sent to the stimulus device of the collar 20. However, if the controller determines such as from a control command that a stimulus (such as a sound and/or vibration and/or an electric shock) is to be applied to the cow 1, then a control signal may be send to the stimulus device to administer the appropriate form(s) and/or intensity of stimulus to the cow 1.

Preferred embodiments include a position sensing system, or interface with a position sensing system which acts to locate animals and locations of interest within a consistent geographical frame of reference. The position sensing system operates to provide animal position data. The position sensing system further operates to provide a reference to any one or more locations. The position sensing system further operates to provide a relative frame of reference to the animal position data and the one or more locations.

In preferred embodiments, the controller is configured to receive or determine location information as described above, including the one or more locations of interest. The location information may be in the form of coordinate data. In some embodiments, the position sensing system is a local positioning system (LPS) or GPS. Each of the local or global positioning systems include one or more transmitter components which output location reference data, and a receiver component which receives the location reference data and determines a location of the receiver component relative to the reference data. For example, LPS transmitters may include one or more beacons such as cellular base stations, Wi-Fi access points, and radio broadcast towers to compute the position of the receiver/sensor.

Locating position information of an object with a GPS position sensor is previously known in the art and calculation of a position is performed by precisely timing the signals sent by GPS satellites high above the Earth. Each satellite may continually transmit messages that may include the time the message was transmitted, precise orbital information (the ephemeris), the general system health, and rough orbits of all GPS satellites (the almanac). The GPS sensor/receiver may use the messages it receives to determine the transit time of each message and compute the distance to each satellite. These distances along with the satellite locations may be used with the possible aid of trilateration, depending on which algorithm is used, to compute the position of the receiver/sensor, and therefore the animal attached to the receiver/sensor.

In preferred embodiments, animal position data is derived from a positioning system receiver attached to a collar worn by an animal, and is configured to communicate LPS or GPS data to the controller to thereby indicate the animal position data.

In some embodiments, the controller is configured to determine the location of each animal wearing a collar. In such embodiments, the controller is configured to receive position data from a position sensing receiver located on each collar. For a herd of animals, the controller may thereby determine the location of each animal wearing a collar which includes a position sensing receiver. In some embodiments, the controller is configured to receive position data pertaining to one or more locations of interest within the geographical frame of reference. In some embodiments, the controller is configured to determine if a control action is required based on a comparison of at least one received position with other position data. The position data may include longitude, latitude, altitude, and/or horizontal position or coordinate data pertaining to the animal or other locations of interest.

Collar General

FIG. 2 is an exemplary depiction of a collar 20 worn by a cow 1. The collar 20 is a housing for numerous electronic components which perform or assist operation functions of the control system 18. The exemplary collar 20 has a positioning system such as a GPS unit 21; wifi 22 or cellular 23 or other wireless network communication radio (herein referred to as a transceiver 23); any number of animal movement sensors 24 such as an IMU/accelerometer, gyroscope, compass or similar; and the processor 25. The processor 25 is connected to and configured for the control of the other components of the collar.

The device may comprise a radio transceiver or use a radio signal in order to report status or the apparatus and/or collar and or to update new boundary and/or other parameters. LoRaWAN may optionally be used for such purpose. LoRaWAN is a media access control (MAC) protocol for wide area networks. It is designed to allow low-powered devices to communicate with Internet-connected applications over long range wireless connections.

An antennae 26 operates to communicate radio signals to and from the collar. The antennae may comprise separate elements tuned for particular radio communication frequencies, or may have broadband or multiband elements such as to combine GPS receiver with wireless network communication into a single package. In some embodiments, the GPS unit 21 and animal movement sensors 24 are referred to as a position sensing device. In some embodiments, animal movement data is derived from the GPS signal. For example, a heading and speed can be derived from changing GPS coordinates; or acceleration data can be derived from changing GPS coordinates and thereby used to determine a change in speed and displacement. Likewise, an IMU or similar device may be used to determine location, heading and/or speed. Methods such as dead reckoning may be implemented to determine one or more of the above, without the use of GPS initially or at all.

Position/Angle/Speed/Heading Sensing in Control Infrastructure

One function of the animal collar 20 is to provide animal position data which includes data derived from an animal location sensor and/or an animal position sensor, and the position data comprises one or more of animal location data (to detect the location of the collar and hence the animal is located), animal heading data, animal speed data, or animal angular position data. The location data is indicative of a particular area of a field or paddock where the animal is located, as well as other metrics such as the distance of the animal from a boundary, fence, a transition or transition area is also detectable when the location of such items is also known. In one exemplary embodiment, a stimulus is applied based on the proximity of an animal to any transition areas.

Figure 4:
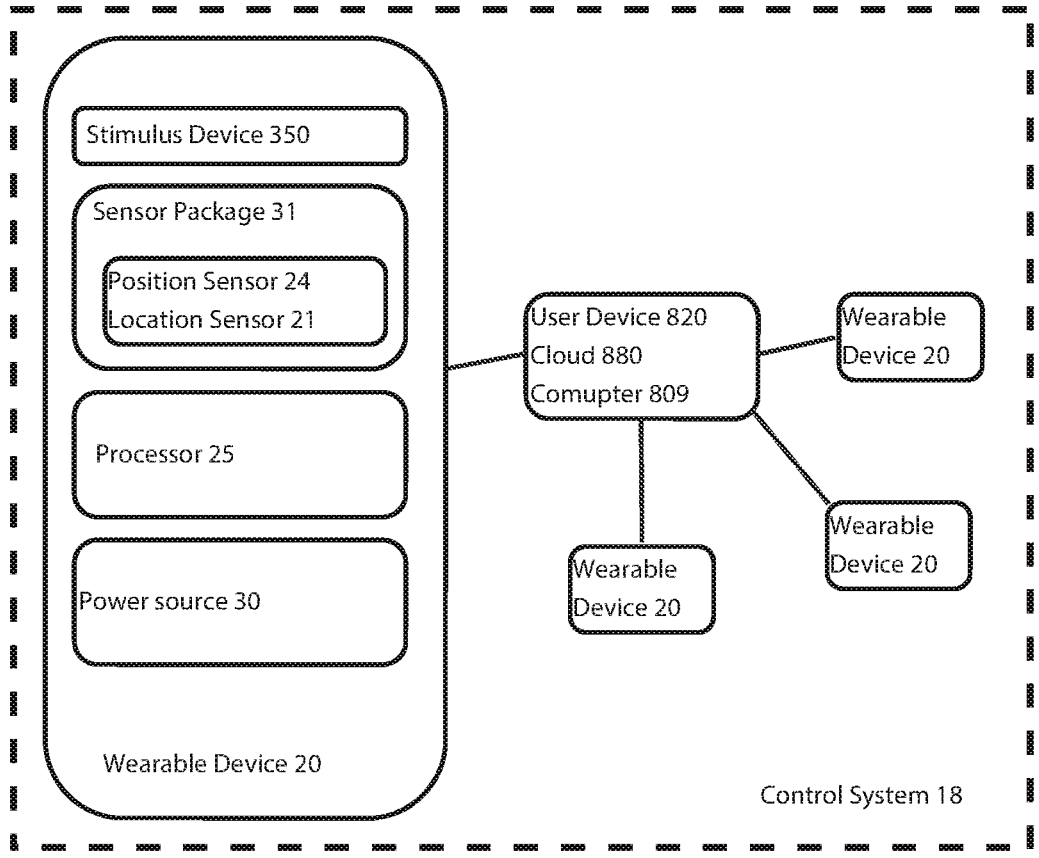
FIG. 4: shows a control system diagram.

FIG. 4 shows a general schematic of the control system 18, including the wearable device 20 that has a sensor package 31 which in preferred embodiments includes the position sensing device 24 (IMU) and a location sensor (GPS/LPS), the processor 25, the stimulus device 350, and a power source 30. The processor is configured to connect with an off-collar system as described above, such as any one or more of the user device 820, Cloud 880 and/or the computer 890. The processor 25 is configured to send and receive data to the off-collar system as may be required to operate any one or more of the processing steps which are described in detail below. The off-collar system is configured to connect with many wearable devices 20, and further, communication to the off-collar system may be individual to each wearable device, or, each wearable device may connect to another wearable device and eventually to the off-collar system.

Angular position data may be derived from the IMU 24 and/or the GPS 21 data. The angular position may be measured in three orthogonal directions: roll, pitch and yaw. The angular position may be the angular position relative to a datum (e.g. horizontal plane or ground). It may be angular position relative to a previously measured angular position. In one embodiment, the angular position of at least one of the head and the neck of the animal is measured in three orthogonal directions. Detection of such angular position can provide an indication of movement in an up and down direction as well as in a left or right direction. If the animal movement sensors 24 are operatively connected to sense the head movement of an animal such as a cow in a field, then movement in up and down direction can indicate that the animal is eating food such as from a location lower than its normal standing and resting condition. The head and neck of the animal will be moving up and down relatively more frequently than if the animal was merely loafing. Similarly, movement in a left and right direction may indicate that the animal is heading/turning to either a left or a right direction. The angular position may hence provide an indication of the animals heading and/or course and rate of change of course. The angular position data may indicate movement of a part of the animal and/or may indicate the entire animal's heading and/or course.

Animal heading data may be derived from the animal location data, for example by determining a direction from two or more location points over time. Heading data may also be derived from other sensors such as the IMU sensor by determining angular rotation or acceleration, or from compass data, should a magnetometer sensor be included in the sensor package 31 of the wearable device.

In some embodiments, the control system is operatively connected to the animal movement sensors 24 and configured to read and compare such angular position value(s)

(position value(s)) with a predetermined value(s) relating to position in order to determine if a control action is required.

Each wearable device 20 within the control system 18 has a processor 25. Further, each of the user device 820, Cloud 880 and/or the computer 890 will typically also have a processor which may be configured to perform some of all of the control functions, calculations and processing steps required to undertake functions of the invention. The processors of the control system 18 may therefore implement control functions according to embodiments of the invention: individually, in combination with one or more other processors, or collectively. The individual, combination, or collective functions implemented by the processor(s) are herein referred to as operations of the 'controller 110'.

Stimulus Device

The collar 20 further comprises a stimulus device(s) 350. Battery or suitable form of power source may be provided to provide power to the processor 25, transceiver 23 and the stimulus device 350. More preferably, the housing comprises, carries or attaches, the battery and transceiver as well.

Figure 3:
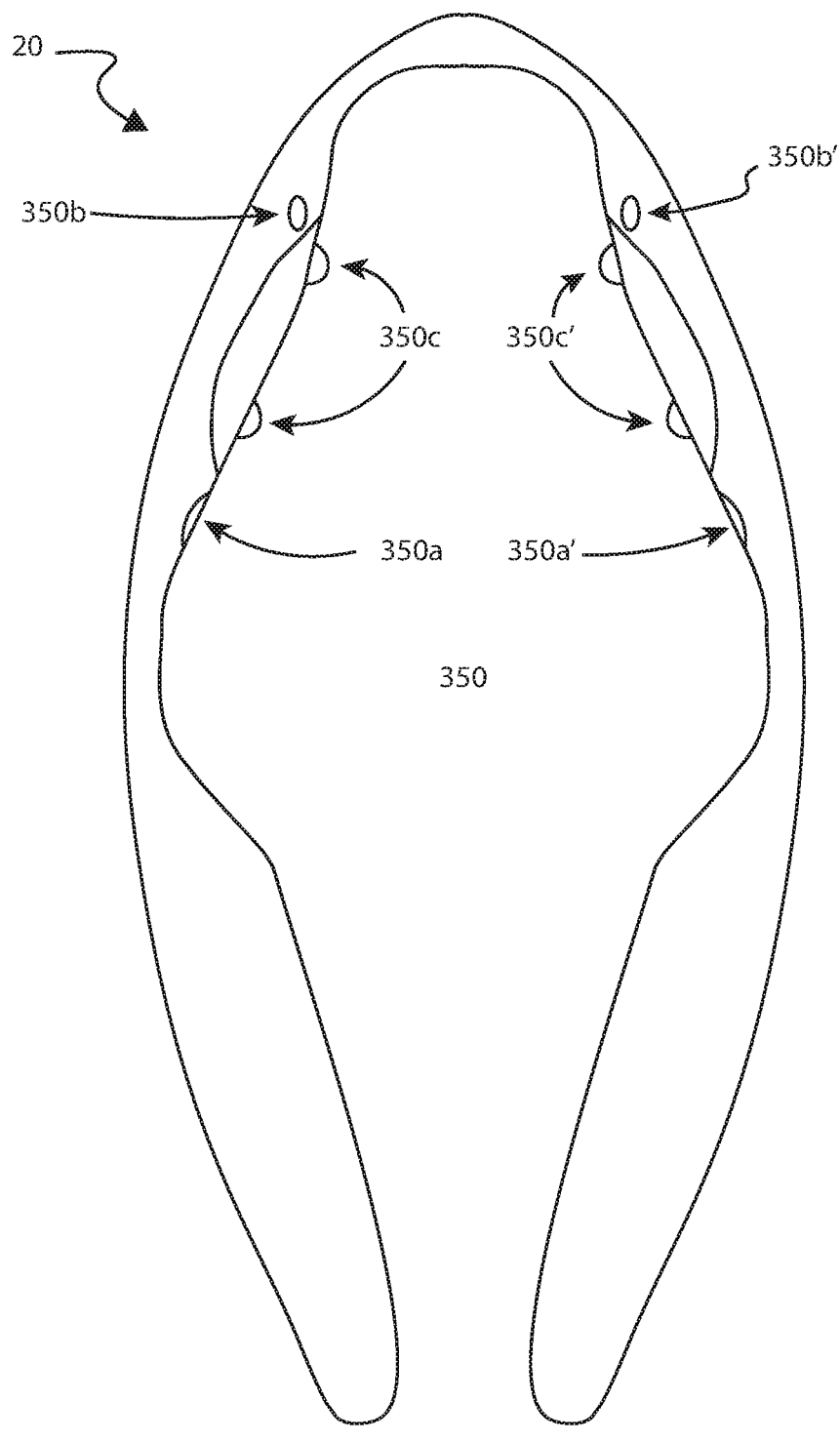
FIG. 3: shows a front view of a wearable device.

FIG. 3 is an exemplary depiction of components of the stimulus device 350 housed by the collar 20. The stimulus device 350 is configured to be activated in order to administer one or more forms of stimulus to the animal. The stimulus may be of any form that could be sensed by an animal such as but not limited to electric current such as electric shock (preferably of variable magnitude, or the number of shock pulses applied with a shock event), sound (preferably of variable volume and/or frequency), vibration (preferably of variable strength or intensity and/or frequency) or a combination thereof. The stimulus device 350 may be one or more of the following; vibrators 350a, piezo or speakers 350b, or electrical stimulus 350c. Where the stimulus device 350 may have left and right focussed stimulus devices 350, e.g a left speaker 350a and right speaker 350a'.

The device 20 may comprise at least one power source such as a battery to provide electrical power electronics on the collar 20, including the stimulus device(s) 350a, 350a', 350b, 350b', 350c, 350c'. In one example, the power source is in the form of two batteries that may be chargeable via solar panels on each side of the device 20. It may be possible that there is only one battery or more than two batteries and if the battery or batteries are chargeable via solar panel(s), then the solar panel(s) may be located on only one side of the device 20.

In this example shown, there may be two speakers 350a, 350a', the first speaker 350a may be on the left-hand side and is adapted to be to be positioned more proximal the left ear of the animal 400 and a second speaker 350a' may be on the right-hand side and is adapted to be positioned more proximal the right ear of the animal 400. Both the speakers 350a, 350a' may be capable of transmitting sound independently and in concert with the other. Instead of having speakers 350a, 350a' on two sides, it may be possible that the device 20 only comprises one speaker(s) on one side, or in the centre position of the collar (300).

In this example, it is shown that there are two vibrators 350b, 350b', the first vibrator 350b is on the left hand side, and a second vibrator 350b' is on the right hand side. Both the vibrators 350b 350b' are capable of vibrating independently and in concert with the other. Instead of having vibrators 350b, 350b' on two sides, it may be possible that the device 20 only comprises vibrator(s) on one side, or in the centre position of the device 20.

There may be electrode(s) 350c, 350c' for contacting the neck of the animal 1 when the device 20 is secured around the neck of the animal to provide an electric current or shock to the animal. The first electrode 350c may be on the left hand side and the second electrode 350c' may be on the right hand side. Both the electrodes 350c, 350c' are capable of providing an electric current or shock to the animal independently and in concert with the other. Instead of having electrodes 350c, 350c' on two sides, it may be possible that the device 20 only comprises electrode(s) on one side, or in the centre position of the device 20. Preferably the device is configured to apply a pulse during a shock, wherein a single shock may have one or more pulses of electricity applied to the animal. The total time of the shock or shock event does not change, but the number of pulses within a shock event may. Dynamically changing the pulses per shock is useful for tailoring stimuli to animals, as different animals react differently to different shock stimuli. A more firmer or more intense shock may have more pulses, than the gentler or less intense shock.

In one embodiment, the device 20 may comprise just vibrator, speaker and/or electrode. In another embodiment, the device 20 may comprise more than two vibrators, speakers and/or electrodes.

It may be possible that the device 20 comprises either speaker(s) 350a, 350a', vibrator(s) 350b, 350b' or electrode(s) 350c, 350c'. It may also be possible that, the collar comprises either speaker(s) 350a, 350a' and vibrator(s) 350b, 350b', or speaker(s) 350a, 350a' and electrode(s) 350c, 350c', or vibrator(s), 350b, 350b' and electrode(s) 350c, 350c'.

The stimulus may be in the form of a sound that is varied in volume and/or frequency, and/or the vibration that is varied in form of strength and/or frequency. For example, the volume and/or frequency of the sound and/or strength and/or frequency of the vibration may be lower initially and gradually begin to increase. The increase in intensity may be based on the urgency in which a response from the cow is desired. If the cow is getting very close to some desired limit such as a virtual boundary, the level of intensity of the sound (i.e. level of volume and/or frequency) and/or vibration (level of volume and/or frequency) may be higher than if the cow was further away or was moving away from the virtual boundary.

Applying/administering at least one stimulus that is of variable intensity level is preferable over applying/administering at least one stimulus that is of constant intensity because applying/administrating at least one stimulus with a variable level of intensity can cause the animal to realise and/or learn if they are heading towards the desired position (or away from an undesired position) or towards the undesired position (or away from the desired position). For example, if the level of intensity of the stimulus increases gradually such gradual increase in the level of intensity can provide indication to the animal that it is heading towards the undesired position (e.g. away from the target location). Similarly, if the level of intensity of the stimulus decreases gradually such gradual decrease in the intensity level can provide indication to the animal that it is heading towards the desired or target location.

At least one stimulus of constant level of intensity may be used for controlling the animal position, such stimulus of constant level of intensity may not be as efficient as the stimulus of variable intensity level especially in helping the animal to realise and/or learn if they are heading towards/ away from the desired or undesired position while the animal is walking. This is because even though suddenly applying a stimulus of a non-variable level may make the animal realise that their position is incorrect it may not necessarily teach them in a systematic manner if the new position that they are now heading towards is the correct or incorrect position.

In some cases, suddenly applying a stimulus of a non-variable level may even confuse the animal. Furthermore, in some cases, if the same level of intensity is provided to an animal frequently that animal can be immune to that particular level of intensity after some period and therefore may become non-responsive to the stimulus of that particular level and hence, stimulus of variable level of intensity may be more desirable even for such reason.

Furthermore, it can be appreciated that having at least one stimulus that is variable in the level of intensity could also result in reduction in power consumption by the stimulus device(s) since applying at least one stimulus at low level of intensity may consume less power than applying the same stimulus at a higher level or constantly at a higher level. In one embodiment, intensity of the at least one stimulus is varied from one level to another level based on the response of the animal to the stimulus, sensed by the at least one position sensing device. In one embodiment, the intensity of the at least one stimulus is increased from one level to another level if the response of the animal to the at least one stimulus that is applied is sensed to be adverse to the desired outcome. In one embodiment, the intensity of the stimulus is decreased from one level to another level if the response of the animal to the at least one stimulus that is applied is sensed to be tending to the desired outcome.

It is mentioned herein that the first and/or second form of stimulus may possibly be administered from the left side, right side and/or both the sides of the cow. However, it may be possible that the first and/or second form stimulus is/are applied to the cow from the top and/or bottom, or intermediate location thereof.

The stimulus such as sound and vibrations need not necessarily be in a form that is unlikeable by the animal. Depending upon the purpose and the type or nature of the animal, the device 20 may be used to apply/administer one or more stimuli (e.g. vibration and/or sound) that the animal perceives to be pleasing, stimulating or likeable. For example, the sound that is applied to the animal may be in the form of an audio tone that the animal generally likes and/or vibration of a strength or frequency that the animal finds pleasant. Application of such a 'positive' stimulus, (i.e. the stimulus that the animal perceives to be pleasant) can be key to strengthening the animal's behaviour. Applications of such positive stimuli can avoid frustration, reduce stress and confusion and in many cases, can provide positive encouragement to the animal or motivate the animal. Positive stimulus can be more effective in terms of training the animal as compared to a 'negative' stimulus (i.e. the stimulus that the animal perceives to be undesirable, annoying, irritating or at least unpleasant).

In some embodiments, the control system may be configured to record data indicating a measure of responsiveness of the animal in response to the application of at least one stimulus. The responsiveness data can be used to set the intensity level of a next stimulus for that particular animal.

If the control system determines or receives a control command that the control action is required, then the control system operates the stimulus device(s) 350a, 350a', 350b, 350b', 350c, 350c' which causes the stimulus device(s) 350a, 350a', 350b, 350b', 350c, 350c' to administer at least one form of stimulus to the animal 1.

The control system is configured to operate the stimulus device 350 with varying the intensity, timing and type of stimulus administration. In particular, the intensity, timing and type of stimulus administration is varied depending on a mode the control system implements to control the stimulus device 350. The modes are determined by the animal's location/position with respect to the transitions a desired location the animal is desired to be guided to, or in response to particular animal behaviours such as changes in speed or direction, or some combination thereof.

Particular mode determinations may also be based on the historic configurations of virtual boundaries. For example, where an animal has been historically controlled in response to the location of a virtual boundary, the animal will remember the location of that boundary, and hence be hesitant to approach that boundary again for fear of the application of an adverse stimulus response. Therefore, where it is desired to guide an animal to a target location at or beyond a historic virtual boundary, this would be considered a 'difficult' transition. Accordingly, in some embodiments, the control system is configured to store locations of historic virtual boundaries the animal has been subject to, and assign the transition as difficult when associated with a new target location.

Exemplary modes include a firm mode where affirmative response is desired, or a gentle mode where the animal is moving substantially as desired. The operation of such modes are described in detail below with reference to useful implementation circumstances.

Functions Implemented by the Controller 110

The controller 110 is configured to guide an animal to a target location by the administration of one or more stimuli to the animal 1. The target location may be defined as an area or as a point in space. To reach a target location, the animal may encounter regions the animal finds 'easy' and/or 'difficult', as arbitrary measures of difficulty, that is, whether an animal will be more or less likely to exhibit a behavioural response which is one of reluctance to enter the region. The stimuli is applied according to at least one of a number of stimulation modes which are determined by the measure of difficulty. Each stimulation mode defines a stimulus type such as sound, vibration and shock, and other variables such as duration, time delays, time durations, and other details which will be explained further below, and are generally designed to elicit the most likely desired behavioural response from the animal.

Further, the controller 110 is configured to guide the animal based on at least one of a number of guidance modes which are based on controls operable to elicit different navigation responses from an animal. In some embodiments, particular variables used for operation of the guidance modes are modified by implementation and feedback determinations of particular stimulus mode application and the resulting outcomes.

Figure 5:
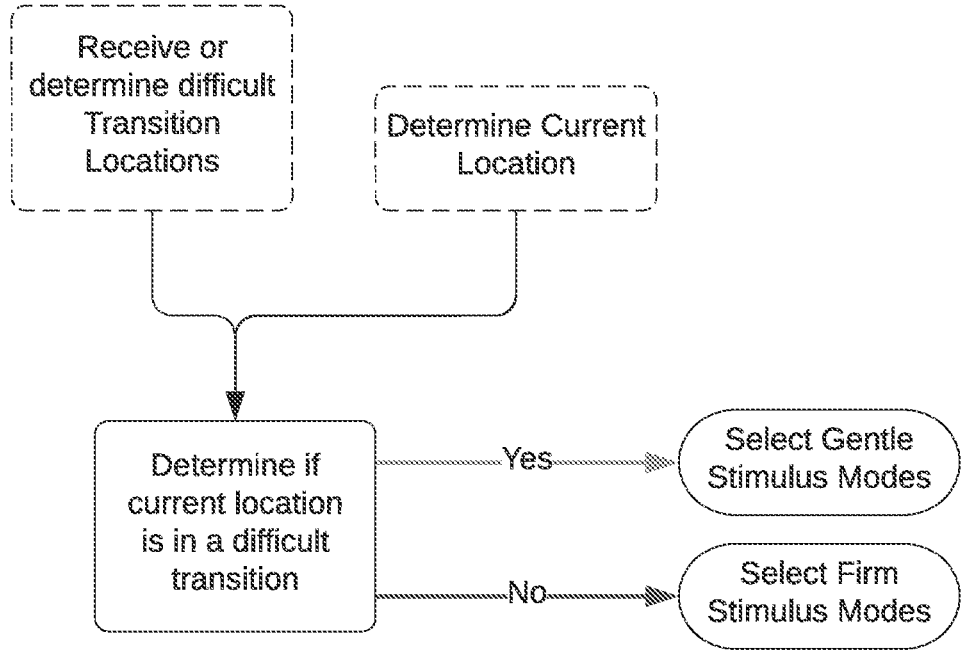
FIG. 5: shows a flow diagram of the controller selecting the gentle mode or firm mode.

FIG. 5 shows a simplified diagram of controller 110 operation for the determination of a particular stimulus mode. The stimulus modes are based on a determination of particular geographical regions or features, a determination of where the wearable device and animal is located, determining, based on the location of the wearable device relative to the geographical regions or features, and determining a stimulus modes accordingly.

Within the control system, each of the particular geographical regions or features are attributed with particular properties which may have, in some way, impact on the behavioural response of an animal and thereby represent a measure of difficulty. Particular geographical regions or features are referred to as 'transitions', which typically represent boundaries, physical or virtual, where the animal has previously been prevented or deterred from crossing.

In one embodiment, a predefined geographical area may be indicated by a user or similar as a high or low pressure stimulus mode area. For example, a farmer, or other user, may indicate that a particular paddock, boundary, transition, gateway, raceway is easy or difficult, and thus should have the gentle or firm stimulus mode applied accordingly. Preferably all transitions where an animal is expected to cross a historical boundary is indicated as a difficult.

In some exemplary embodiments, the measure of difficulty for a gentle mode is determined by data indicating the animal device is one or more of:

being outside a threshold distance to a threshold number of other animals or similar devices. This is because animals don't tend to want to stray away from the herd, so a gentle mode would be desired to encourage the animal to move away from the herd. Further, the number of animals in a herd, or proximity to a number of animals will affect the measure of difficulty, and/or the variability of stimulus applied. For example, a stimulus may be more gentle for a higher number of animals compared to a lower number of animals in a herd or proximal to, encountering a virtual boundary for the first, second or third time, or any time during the animals training period, or time within a new virtual paddock;

approaching or being within a prior virtual boundary of a geographical area that was known to the animal previously; known in this respect refers to a virtual boundary that the animal has encountered and a stimulus response was applied to the animal in response to their proximity, or similar, to that boundary;

approaching a virtual or physical gateway through a physical boundary;

within any predefined geographical area indicated as a low pressure stimulus mode area (gentle mode), this may be set by the user; and/or approaching a virtual gateway through a virtual boundary;

In some exemplary embodiments, the measure of difficulty for a firm mode is determined by data indicating the animal device is one or more of:

approaching a known virtual boundary. Where a known virtual boundary may be defined as a virtual boundary which the animal (i.e animal device) has interacted with multiple times before. In one embodiment, the animal device worn by the animal is configured to recall how many times it has interacted with a virtual boundary. Where interaction may be defined as the animal device giving a stimulus to the animal.

is within a threshold distance to a herd of like animals or devices.

within a geographical area defined paddock boundary, that is defined physically or virtually. When animals are being guided towards a target location within a paddock, with no previous or discernible features that would hinder their progress, firm or normal operating modes can be used.

within any predefined geographical area indicated as a high pressure stimulus mode area (firm mode), and/or within a geographical area defining a raceway. Where a raceway is any narrow avenue of thoroughfare for animals to travel within. Usually between a paddock and a milking shed.

Accordingly, in some embodiments the controller 110 is configured to store data indicative of the location of boundaries over time, and data associating a stimulus response being applied to an animal based on an encounter with the boundary. Further, the controller is configured to store data indicative of the location of animals over time, and further make determinations of the proximity of one animal to one or more other animals or devices.

Figure 6:
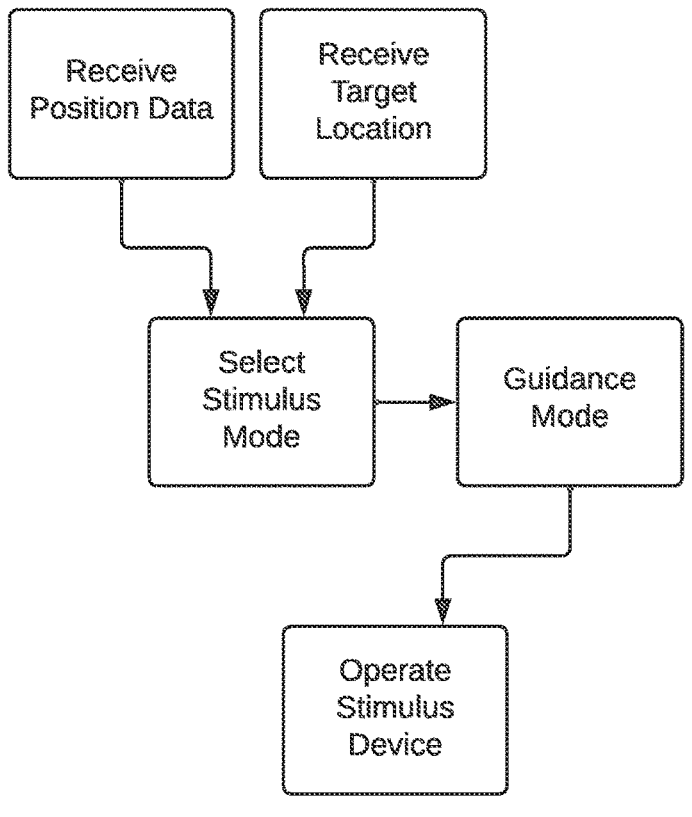
FIG. 6: shows a flow diagram of the controller operating the stimulus device.

FIG. 6 outlines a simplified process implemented by the controller for undertaking guidance operations. In preferred embodiments, the controller is configured to receive data defining a target location the animal is intended to be guided to. This defines a hypothetical pathway the animal will take between its current location and its desired target location. The controller is configured to identify any particular geographical regions or features which might be characterised as 'difficult'. To implement the guidance function, the controller is configured to receive the location position data and/or angular position data of the wearable device from the location sensing devices on the wearable device. Then, the controller is configured to select the stimulus mode based on the position data of the wearable device.

The stimulus mode is based on the above mentioned difficulty determination. Finally, the controller operates the stimulus device 350 to guide the animal to the target location according to the selection of the stimuli mode and a guidance mode. The guidance modes control the stimulus in one of a selection of stimulus modes to thereby elicit a desired response from the animal.

Transition Characterisation

Figure 7:
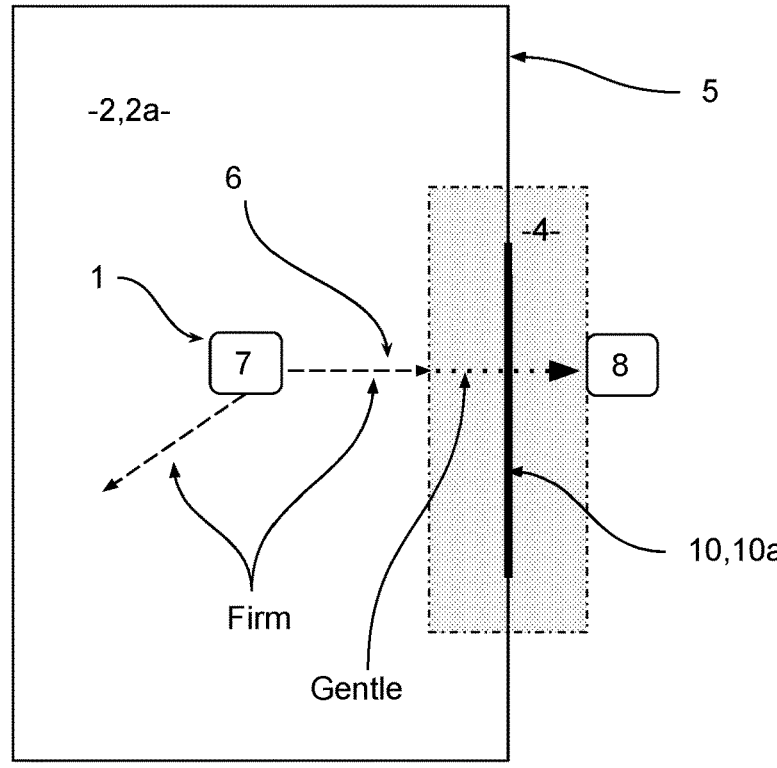
FIG. 7: shows a schematic view of a path across a paddock and into a virtual paddock boundary transition.
Figure 8:
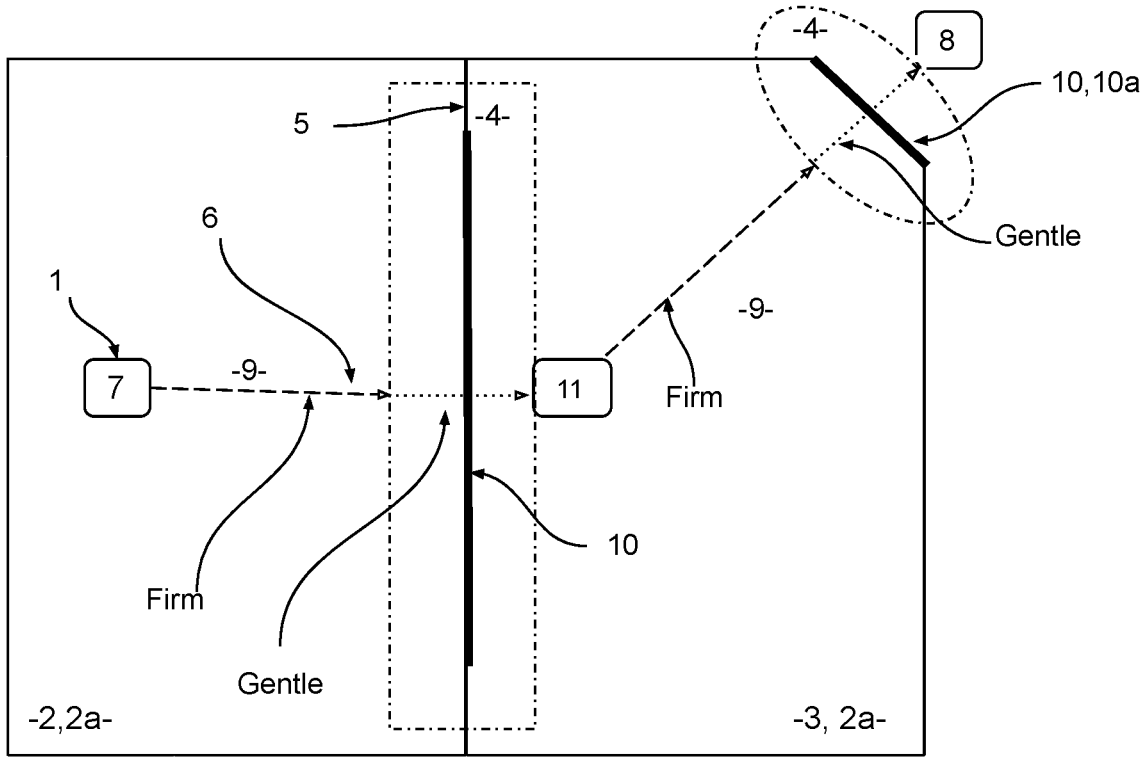
FIG. 8: shows a schematic view of a path across a paddock and into a virtual paddock boundary transition, and continuing across a second paddock and into a gateway transition.

FIG. 7 and FIG. 8 illustrate exemplary scenarios where some transition types 9,10, might be encountered by an animal being guided by the controller. Accordingly, embodiments of the invention are directed to guiding animals 1 across different transition types the transition types may be categorised. FIG. 7 and FIG. 8 show exemplary geographical layouts of an initial animal location 7 and a target location 8, where the animal is to be guided along a heading 6 from their initial location to the target location. The initial location 7 may be where the animal is currently located, or maybe where the animal is desired to be prior to starting along the heading 6. Between the animal (device) location and the target location 8 there is an exemplary transition region 4. A path 6 may cross one or more transitions. The one or more transitions may be a combination of easy transitions 9 and difficult transitions 10. The path 6 may have one or more waypoints 11 along it. The waypoints 11 may be initial or target locations for shorter paths within or along the path 6.

Exemplary scenarios are discussed below with reference to such easy or difficult transitions. As such, the control system is configured to characterise particular transitions as 'easy' or 'difficult' categories. A difficult transition is a transition that the animal will or could be hesitant to make the journey across or into. For example, where previously a paddock boundary or gateway was off access to the animal. The animal would have received an aversive stimulus should it have tried to cross the paddock boundary or gateway, as such there is likely to be hesitancy by the animal if subsequently the animal is attempted to be guided across the same boundary or gateway. As such, the transition is deemed difficult based on historic application of an adverse stimulus. Therefore, in some embodiments, the control system is configured to store the location of any application of adverse stimulus, and in some embodiments, may automatically assign a transition as a difficult transition if an adverse stimulus had previously occurred at that location.

A difficult transition may be generally characterised as any region of a path, or location or area, which the animal may be more hesitant to cross compared to another part of the path or area. An easy transition 9 may be any other transition, or portion of path, that the animal is less hesitant about crossing or travelling along compared to a difficult transition 10. The easy transition 9 may not necessarily be defined as a transition, but can be any area or part of the heading 6 that is not a difficult transition 10. For example, if an animal needed to be shifted from a paddock and out through a gateway 10a or opening 10a in paddock 2a, break or field), then shifting anywhere within the paddock 2a may be considered an easy transition 9, where the gateway transition is considered a difficult transition 10. Anywhere within the paddock 2a may be considered easy as the animal was previously allowed to move around in that area freely, and hence the movement in the area would be known to the animal. However, if the animal was previously restricted from going out of the gateway 10a, then trying to move the animal 1 out of the gateway will likely be more difficult.

In some embodiments, easy 9 or difficult 10 path regions are predetermined. In some embodiments, easy or difficult path regions are determined based on animal sensor data.

The transitions 9, 10 may have an associated transition area 4 to it in which a particular stimulus mode will be applied if the animal locates itself within the transition area 4. For example, a gateway may have a transition area 4 associated with it, where the transition area is defined by a perimeter that extends a given distance from the gateway, or a portion of the gateway, in all directions.

In one embodiment, the heading 6 can be simplified to any path with an easy transition 9 and a difficult transition 10 intermediate an initial location 7 and target location 8. If the gateway 10a is defined or determined to be a difficult transition 10, then when the device 20 is located within the difficult transition 10 transition area 4 (difficult transition area 4) the controller 110 will apply the firm mode to the guidance programmes.

Stimulus Modes

In preferred embodiments, the control system is configured to apply at least one of a specific stimulus mode depending on the transition type encountered by an animal according to its location relative to particular features of the animal's environment. The stimulus modes are dependent on the transition type. The stimulus mode will affect one or multiple variables of the stimuli administered by the wearable device 20 to the animal 1. A 'firm' mode will be utilised for easy transitions, and a 'gentle' mode will be used for difficult transitions. In particular, the controller 110 can implement multiple different guidance programmes, and each programme will have a firm mode and a gentle mode for deployment at different regions of a path to a target location. The firm mode and gentle modes of each guidance programme will typically be stored for execution by the processor of each wearable device and deployed based on the detection of a transition being reached, such that the processor is operable to apply the appropriate stimuli to the animal depending on the mode. This may be achieved by execution of software on the processor 25 to therein control the stimulus device 350. However, in some embodiments, a stimulus is applied based on the detection of animal behaviour and/or the animal location.

The gentle mode will configure the guidance programme to apply stimulus to the animal in a more relaxed manner, for example but not limited to; increasing the time before applying the stimulus after a determination of position correction is required, reducing the stimulus strength, allowing the animal more freedom to move and explore the area before applying a stimulus etc. The firm mode will be firmer than the gentle mode and may be considered as a normal stimulus used to guide the animal when not crossing difficult transitions. Giving an animal, for example; more freedom to move, more time before having to move, reducing stress, and/or reducing stimuli inputs via a gentle mode will more likely result in the animal crossing the difficult transition 10, compared to applying a firm mode which may stress the animal and cause it to not cross the difficult transition. Using gentle stimulus modes for more difficult transitions is contrary to common knowledge, as when training or guiding an animal, often more inputs and stimuli are implemented to try and push or encourage the animal across a difficult transition. A 'hands off' approach where less stimuli are applied when using remote guidance of cattle can be used with the wearable device due to the extra time afforded by not using manual labour to shift the animal, such as cattle, in person. In general, the firm mode is designed to elicit a stronger level of behavioural response from the animal than the gentle mode.

The firm mode will implement more 'pressure' to the animal than the gentle mode. For example, the firm mode will mean a stimulus is applied quicker to the animal than the gentle mode. In practical terms, this relates to the guidance programme having it's variables modified, or other variables chosen, for the gentle mode. Alternatively, other stimulus changes such as increasing stimulus intensity, and/ or giving the animal less freedom to move before applying a stimulus etc, may be implemented with the firm mode.

The animal may be guided along a heading 6 to the transitions 9,10, and/or through the transitions, for example from a first area to a second area via the transition. Alternatively, the animal may be guided from its current location 7 directly to the target location.

The transition area 4 may fully surround the transition 9, 10 or may be only around portions of the transition 9,10. In other embodiments, the transition area 4 is not symmetrical about the transition 9,10. For example, the transition area 4 may only, or majority, be on the animal side of the transition or be more pronounced on said side, i.e the transition area is on, or is more on, the paddock 2a side of the gateway 10a (i.e on the initial location side), and once through the gateway 10a, the animal leaves the transition area 4. Alternatively the transition area 4 may extend more towards the initial location 7, and less towards the other side of the transition 9,10. An ellipsoidal transition area 4 is shown in FIG. 8 around a gateway transition 10, and a rectangular transition area 4 is shown in FIGS. 7 and 8 around a transition 10. It is expected numerous shapes, sizes, and configurations of transition area 4 may be implemented.

The transition area 4 may also equate to the paddock 2a area. Should a difficult transition 4 be defined, an easy transition area may be determined as all locations or areas outside of the difficult transition 4. In one exemplary embodiment, the transition distance around the transition 9,10 that defines the transition area 4 is between 2 and 100 metres. The transition distance will depend on the type of transition, and the transition distance may or may not be symmetrical. For example, for a small gateway 10a, the transition distance may be 10 metres. For example, in a very large paddock, where the transition 9,10 is a very long boundary, the transition area 4 may be defined by a transition distance of 50 m from the transition 9,10. The transition area 4 may also be defined by an area that surrounds the transition 9,10. For example, a 100 m2 area surrounding the transition 9,10.

In order for the animal to be guided to the target location 8, the processor 25 is configured to operate the stimulus device(s) of wearable device 20 and must determine, or be supplied with, information that allows determination of when to send signals to the stimulus device to apply the desired stimulus to the animals. The processor 25 may receive data to determine the information from, for example, one or more sensed conditions, such as a location, being met, or may receive the information from an off-collar processor in the control system 18, such as the user device 820.

The processor 25 is configured to receive location information relating to one or more of data from an onboard and/or off-board position sensing device defining at least the location of an animal, data defining at least one target location 8 where the animal is desired to be, and data defining transition 9,10 locations. The processor 25 is configured to receive and or determine the information relating to one or more of the of the following initial location 7 and/or current location of the animal from the position sensing device, data defining operational characteristics of the stimulus device 350 regarding a stimulus or stimuli to suggest movement to guide the animal to the target location 8 may also be determined or supplied to the controller, data defining a heading 6 or pathway with waypoint in which the animal needs to take from its initial or current location to get to the target location, data defining transition area 4 specifications, and data defining transition area distances.

Guidance Programmes

A variety of guidance programmes are described below and are each designed to apply specific stimulus and timings intended to coerce or guide an animal along a target heading and/or towards a target location. The guidance programmes may also be described as a stimulus programme, guidance, or guidance attempts, as they are configured to attempt to guide an animal. In some embodiments, the guidance programmes are stored by the processor 25 for execution when required, and are described below as such. However, the programmes may equally be stored and/or executed by any other processor of the control system as described in detail above, with the resulting stimulus control signal being communicated to the processor of the wearable device when required.

The guidance programmes are modified by the stimulus modes, i.e. firm modes or gentle modes will affect the variables of the guidance programmes. Each guidance programme is configured to achieve at least one particular goal or is used for at least one particular use case or reason. The stimulus mode of the guidance programme will depend on the location of the animal and their wearable device 20 and whether it is at or near a transition, or within a transition area 4. Below are some examples of various stimulus modes that may be implemented by the processor 25 to control the stimulus devices, along with the modifications/differences that the stimulus modes make to the guidance programme.

Firm mode or high pressure stimulus modes may also be described as normal operating conditions. For example, the gentle mode is gentler than the firm mode. Where the firm mode may either be firmer than a normal operating mode, or the same.

The position sensing device 24 senses the location of the wearable device 20 and sends this information to the processor 25. The processor 25 is configured to determine whether the wearable device location of the device 20 is within a transition area 4 deemed to be difficult, and if so, apply a gentle mode for a stimulus that is to be administered. For example, an example of the angular sensing is when the processor 25 receives an angular position of the device 20, such as the device 20 or animal moving left, then the processor 25 will then send a control signal to apply the appropriate stimulus if required to prevent the animal from moving further left.

The guidance programmes and associated modes below give some examples of times and ranges. A large variety of time ranges are possible to be implemented, and may be chosen by the user, or pre-programmed for best results relating to the animal and/or environment. Likewise, for the strength, type, application, intensity, pattern, and/or order of the stimulus applications.

If guidance programmed if utilised by the processor 25 is herein described as enabled, and if not used, disable. If the processor 25 receives the appropriate inputs to therefore enact the guidance programme to therefore administer stimulus to the animal, or provide a guiding attempt, it is herein described as being activated, and vice versa, deactivated.

Figure 9:
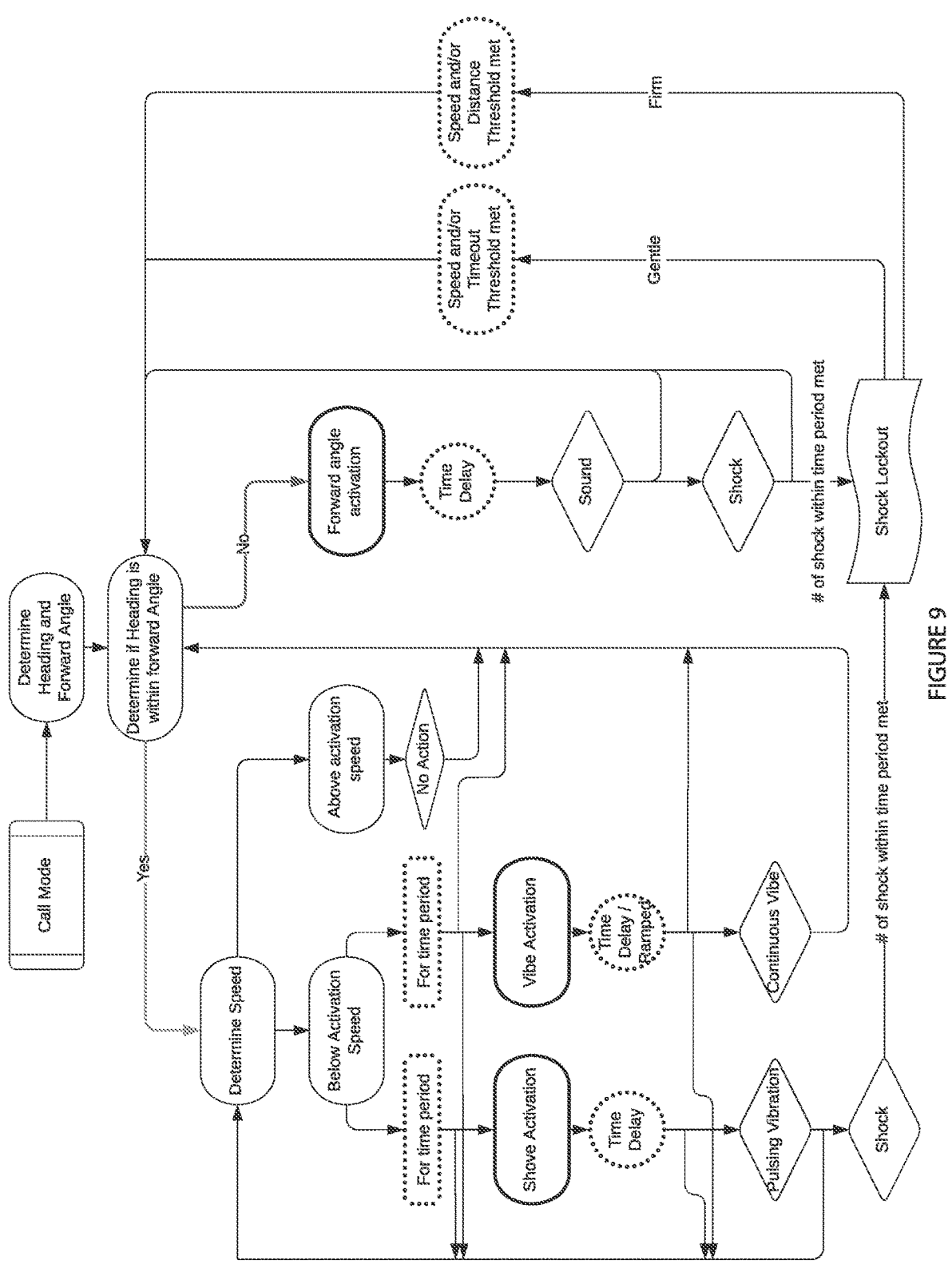
FIG. 9: shows a flow diagram of the controller activating the guidance programmes.

FIG. 9 shows a detailed view of an exemplary guidance mode process the controller is configured to operate, including guidance modes, the operation of each described in detail below. Execution of a guidance mode process is undertaken following execution of the stimulus mode determination since determinations made by the controller according to some of the guidance modes have variables that are determined by the stimulus mode determination.

In accordance with each of the below described guidance modes, the controller is first configured to determine the heading (forward angle) of the animal from the sensor suite of the wearable device sensor, a target heading for the animal to follow to move toward a target location, and a heading tolerance threshold which is defined by the stimulus mode determination. The controller is configured to compare the heading of the wearable device to the heading tolerance threshold. When the heading is within the defined tolerance, and if so, a first control branch is executed to determine whether a guidance mode to promote acceleration of an animal is to be activated. When the heading is outside of the permitted tolerance band, the controller is configured to execute a second process branch which includes execution of a programme operable to elicit redirection of the animal back toward the target heading of the target destination.

In a further embodiment, not shown in FIG. 9, the controller checks to see if Guidance Programme Shove is active, and if not and if warranted, activates forward control.

In some embodiments, the controller is configured for the closed loop control of animal guidance, based firstly on data defining the location of the animal relative to locations with predetermined characteristics which define stimulus outputs to the animal. Further, the closed loop control comprises determinations of animal heading and speed data and comparison of that data to predetermined tolerance ranges or thresholds. Based on ongoing measurement of animal speed, heading and location in response to the stimulus outputs, the controller is configured to change the predetermined speed or heading tolerance or range.

In its simplest form, the control strategy outlined by FIG. 9 is one where the animal is first ensured to be directed toward a target heading. Accordingly, the forward angle programme is executed where the controller determines the animal heading is outside the heading tolerance permitted for the forward angle programme. When the animal is within the target heading tolerance range, the controller is configured to determine the animal speed. Based on the animal speed and by comparison to one or more thresholds, one of several guidance programmes may be initiated with the intention to elicit a behavioural response which promotes the animal speed being guided to a desired range.

Each of the guidance programme modes has particular stimuli output characteristics which are determined by the stimuli mode. The stimuli mode in turn is determined according to the animal location with reference to any proximate regions which may have predetermined behavioural responses-being one of reluctance to approach or enter the region, or not.

Guidance Programme: Forward Angle

The object or reason for the forward angle guidance programme if enabled is to guide the animal in a desired direction/heading. The desired direction may be along a path, or towards the transition or target location. To allow an animal or cow (as used in the current and below examples) to move freely as she moves towards her destination, the processor 25 is configured to control a stimulus response to elicit forward movement of the animal toward a heading which has a permitted heading span, forward angle, or heading tolerance threshold. This heading tolerance threshold is a variable that can be set on a per animal 1 (i.e per device) basis for various different scenarios in degrees either side of zero. E.g. a 40 degree heading tolerance threshold, means from −40 to +40 degrees either side of 0, where zero is the angle towards the target location or next waypoint 11, so a total angle of 80 degrees. When an animal 1 is (i.e the device) is facing or heading outside of the heading tolerance threshold, the forward angle programme is activated and the processor 25 is configured to administer a stimulus to the animal to attempt to steer it back into the permitted range of heading tolerance threshold. E.g a sound stimulus is applied to the left ear of the animal 1 via the speaker 350a if the animal moves too far left out of the heading tolerance threshold and vice versa. The angles do not need to be symmetrical about the 0 degree heading.

Depending on the guidance setting, firm or gentle, the heading tolerance threshold can be altered or chosen from a data set. Preferably for all guidance modes where applicable, a firm guidance setting will have a narrower heading tolerance threshold than the gentle guidance setting. Where narrower is generally defined as smaller angle than a wider heading tolerance threshold. Angles can be altered depending on the animal type, paddock type, type of forage (i.e crop or grass), type of transition (gate or boundary) etc.

The stimulus may possibly be in a form of shock, sound and/or vibration on the left side, right side and/or both the sides of the animal 1, as administered by the stimulus devices 350 as herein described. For example, if it is indicated that the animal 1 is turning (by sensing rotational displacement) or has turned too much left (by sensing heading), or has exceeded the permitted deviation from a target heading, then the stimulus may be applied to the animal 1 on the left hand side thereby attempting to persuade the animal to turn right. Similarly, if it is indicated that the animal 1 is headed too much right, then the stimulus may be applied to the animal 1 on the right hand side so that the animal 1 is guided left. If the stimulus is positive and not aversive, then the stimulus may be applied on the side of the animal that is the side that the animal is desired to turn to.

Firm:

If the animal's heading is outside, or about to be outside of the target heading tolerance threshold (via the device position sensing device detecting so, or similar), then the forward angle programme is activated. As such, stimulus is applied (via implementation by the processor 25) after a set amount of time spent outside of the heading tolerance threshold.

In one embodiment, if the device is headed outside of the heading tolerance threshold, for example, of 40 degrees, the processor 25 will administer a first stimulus immediately once out of the heading tolerance threshold. The first stimulus may be a sound applied at a moderate strength, for, for example, 3 seconds or until the heading is corrected by the animal.

Alternatively, instead or in combination with a delay in time between applying the stimulus, the stimulus may increase in intensity, preferably the increase in intensity is slower over time compared to the gentle mode. E.g a slow ramp. The increase may be linear ramping to increase the sound level, or frequency. The processor 25 may then be configured to wait for a larger amount of time, for example 3 seconds, and then apply a second stimulus to the animal if the animal is still outside of the heading tolerance threshold. The second stimulus is a shock applied at a moderate strength, for, for example, 3 seconds.

The processor 25 will deactivate the forward angle programme once it determines that the animal's heading is within the heading tolerance threshold.

Preferably the processor 25 is configured to reduce the heading tolerance threshold for the firm guidance mode, compared with the gentle guidance mode. In one embodiment, the heading tolerance threshold for firm guidance mode is less than 90 degrees, preferably less than 60 degrees, and in one embodiment 45 degrees. However, any number of degrees less than 90 and greater than 10 degrees is possible. As long as the thresholds are different between the firm and gentle mode.

Gentle:

The gentle mode of forward angle programme will modify the variables of the forward angle programme, or be a modified version thereof. For example, one or more of the below variables may be modified.

Increase time before the first stimulus is applied. This may be the first, or first and second stimulus. For example, a sound stimulus is applied if the animal 1 remains outside of the heading tolerance threshold for more than 2 seconds, which is greater than the firm mode which is instantaneous.

Increase time before a second stimulus is applied. For example, if being applied, the second stimulus is applied 5 seconds after the first stimulus or a desired time that is at least longer than the firm mode.

Increase the angle of the heading tolerance threshold (heading angle range). The heading tolerance threshold is increased from, for example, 40 to 80 degrees. This allows the animal 1 more freedom to explore the path and/or transition. Preferably the processor 25 is configured to increase the heading tolerance threshold for the gentle guidance mode, compared with the firm guidance mode.

Decrease stimulus intensity. For example, the sound is quieter, the shock is less intense, and/or the vibration is less intense. The stimulus may be applied for a shorter time, or intermittently such as pulsed, instead of in longer applications.

Alternatively, instead or in combination with a delay in time between applying the stimulus, the stimulus may increase in intensity faster over time compared to the firm mode. In one embodiment, the increase may be a linear ramping increase to sound level, or sound frequency. This is implemented because should an animal do something wrong within the gentle mode, a more firm stimulus should be applied to quickly deter the animal. However should the animal be doing the right thing, (e.g heading with the threshold tolerance) then less stimulus (cues) and more time between stimuli. Outside of the heading threshold is considered the wrong thing for the animal to do as it is not headed towards the target location.

Decrease rate of stimulus application. For example, the sound stimulus may be slowly ramped up louder, instead of being applied at a continuous volume.

Do not apply a further stimulus. For example, there may be no stimulus after the first stimulus, or no third stimulus after a second stimulus, or no second stimulus between a first stimulus and third stimulus.

is moving at a higher, or the maximum threshold, speed. The intensity of the vibration may be inversely proportional to speed of the animal.

The vibe programme may be enabled in combination with the forward angle programme, and the vibe programme is configured to administer vibration as soon as the sensed heading is within the heading tolerance threshold. As such, when the stimulus from the forward angle programme has ceased by the animal orienting its heading within the head-

| | Gentle (Low Pressure Stimulus Mode) Stimulus Response | Firm (High Pressure Stimulus Mode) Stimulus Response |
| --- | --- | --- |
| Heading Tolerance | Wide angle E.g 60 degrees total, or more than 30 degrees each side | Narrow Angle E.g 59 degrees, or less than 30 degrees each side. |
| Delay Before First Stimulus | Delay or long delay E.g 1 second to 5 second delay after leaving heading threshold | No delay or a short Delay E.g immediately apply first stimulus, or 0.5 second delay after leaving heading threshold |
| First Stimulus (E.g Sound) | Time the stimulus is applied. E.g A longer time, for example a sound for 5-20 seconds whilst the animal remains outside the heading threshold Intensity. E.g Pulsed or quieter volume. Ramping. Slow ramping, for example ramped sound over 5 seconds before applying a maximum volume. | Time. E.g A shorter time, for example less than 5 seconds. Intensity. E.g Higher volume Ramping. E.g fast ramping, e.g over 2 seconds before maximum volume, or no ramping. |
| Delay Between First and Second Stimulus | Delay, long delay E.g 2 seconds after the first stimulus started. | No delay, Short Delay E.g second stimulus immediately after the first stimulus finishes |
| Second Stimulus (E.g Shock) | Intensity. E.g a single pulse within a 1 second shock period. | Intensity E.g 2-5 pulses within a 1 second shock period, or E.g two or more shocks |

Guidance Programme: Vibe

The Vibe programme is used to encourage the animal 1 to move and/or move faster. If the vibe programme is enabled and activated, vibration stimulus is administered to the animal 1 by the processor 25 controlling the vibrator(s) 350*b*, 350*b'* if the animal walks forward with a speed between a speed range, and preferably with a heading within the heading tolerance threshold prescribed or towards the target location 8. Preferably the vibe programme is activated until the animal has reached a desired speed, e.g a typical walking speed.

Firm

The firm mode is intended to apply vibration stimulus to the animal, when it is still or moving, to encourage it to move or keep moving. The processor 25 determines from the heading data that the animal is moving within the heading tolerance threshold and is therefore heading substantially towards the target location. Then, the processor 25 will cause the vibration stimulus to be administered via activating the vibrator(s) 350*b*, 350*b'*, if the processor 25 determines the animal speed is within a desired speed range, or above a speed threshold.

The vibration may continue to be administered until the animal reaches a threshold predetermined maximum speed as sensed by the sensing device, and/or the vibration stimulus may also ramp downwards in intensity and/or frequency as the animal's speed increases as sensed by the sensing device. I.e the vibration intensity administered is inversely proportional to the animal's speed. In some embodiments, the vibration stimulus is applied for a time period, regardless of the animal speed once activated.

In one embodiment, the vibration stimulus of the vibe programme is ramped from a maximum intensity when the processor 25 determines the animal is not moving, to zero or low intensity when the processor 25 determines the animal ing tolerance threshold, then the vibe programme will administer the vibration stimulus if within the predetermined speed range.

The shove guidance programme, described later, may be implemented by the processor 25 after the vibe guidance programme has administered a stimulus for a period of time, and the animal has not changed its speed. For example, the processor 25 has determined the animal is not moving and has turned on the vibrator for 10 seconds. The processor 25 then determines the speed has still not changed and then starts the stimulus administration as per the shove programme.

In one embodiment, the vibration stimulus disablement speed, at which the vibration stimulus are no longer administered when the animal moves slower than a predetermined speed, is the same as the shove programme stimulus activation speed threshold. I.e., below a certain animal speed the vibe programme stops stimulating, and the shove programme starts stimulating.

Gentle

For the gentle mode of the vibe programme, the stimulus can be delayed, as well as being less intense. The intensity reduction is achieved by not applying a vibration stimulus, or delaying the onset of a vibration stimulus for a period of time after the vibe mode is activated by the speed and heading control criteria being met.

In one example, the processor 25 will activate the vibrator(s) 350*b*, 350*b'* after a delay of time once the position sensing device has sensed the animal has a heading within the heading tolerance threshold, and it's speed meets the speed criteria. This delay in time can be between 1 and 500 seconds. Preferably the delay in time is 30 seconds.

In one embodiment, the vibration stimulus in the gentle mode may be applied to the animal for less time than the firm mode, should the animal not change its speed. For example, the duration is 15 seconds, but may be more or less depending on the other guidance programme settings, particulate the shove guidance programme.

In one embodiment, the vibration stimulus are stopped once the animal exceeds a speed threshold, for example 200 mm/s. The controller continually checks the animal's/device's speed and heading as the stimulus are being applied, and if the speed exceeds the speed threshold, and/or the heading threshold tolerance is exceeded, then the stimulus will be stopped. The vibe programme can then repeat as necessary.

In one embodiment, for the gentle mode of the shove programme, the shove programme may not be activated for a delayed time period after the last vibe programme stimulus was applied, or not at all. In one embodiment, the controller will ramp the vibration stimulus up from a low intensity to a high or higher intensity at the beginning of the administration of the vibration stimulus. the animal may feel more calm due to stimulus being administered less abruptly. For example, the ramp time may be 5 seconds, and then applied at maximum intensity for 10 seconds.

In a preferred embodiment, the vibe stimulus once activated is applied at a low intensity and ramped to a high within 15 seconds.

Preferably the forward angle guidance programme takes precedence over the vibe guidance programme. That is, should the controller be activating the vibe guidance programme and then the heading threshold is not met, the vibe guidance programme will deactivate and the forward angle guidance programme will activate.

Guidance Programme: Shove

Shove is a guidance programme comprising a stimulus pattern to be administered to an animal consisting of a sequence of pulsing (pulsing being intermittent, either by turning on then off, or increasing then reducing the intensity) vibrations reinforced with shock as a way to encourage animals to move forward. Shove is enabled by the controller when the animal is desired to be moved forward but the animal is not moving forward, or not moving at a speed above a predetermined speed threshold. Shove may be enabled with the other herein mentioned guidance programmes.

Firm:

The firm mode of will modify the variables of the forward angle programme, or be a modified version thereof. For example, one or more of the below variables may be modified.

Activation speed. The activation speed (aka low speed threshold) sets the speed threshold the animal 1 needs to be moving below before the processor 25 activates the shove guidance programme. The activation speed may be between 0 mm/s and 500 mm/s. However, the activation speed may be faster.

Deactivation Speed. The deactivation speed sets the speed threshold the animal 1 will have to exceed to deactivate the shove guidance programme after it is activated. The default firm mode deactivation speed is 200 mm/s. The deactivation speed may be the same as upper end of the activation speed, in other embodiments it may be larger or smaller.

Delay time is the main variable used to give animals more or less time to stand still, or more or less time to move slowly. When choosing the predetermined delay time, the user should think of the worst case scenario. For example, bottlenecks, tight gateway entrances, steep topography and similar. Delay time sets the time in milliseconds the animal 1 be still or move slowly before the shove programme is activated, or the shove programmed starts to apply stimulus or stimuli. For a firm mode, the delay time may be set to 15 seconds (15000 ms).

The herd size may affect the delay time the use predetermines. E.g for a herd of 80-150 the likely delay time may be 10 seconds. For a herd of 200+ animals a delay time of more, such as 15 seconds may be used. The delay time may be dependent on what the use case is-if the herd is bunching around a gateway 10a and stopping, more delay time will need to be given. Each time the shove programme is disabled, for example, by the animal walking above an activation speed, the delay time will reset.

Preferably the delay time matches up with the end of the vibe guidance programme. For example of the vibe duration is applied instantly (no delay) and then for 15 seconds, then the shove guidance programme is activated at 15 seconds. This allows the pulsing vibration to be applied after the vibe vibration have stopper. In a further embodiment, if the vibe is delayed for 10 seconds, and then applied for 15 seconds, the shove programme may be activated at 25 seconds.

Preferably the shove guidance program is activated after the vibe guidance programme.

Pulse time. Once the delay time has been met, the shove programme applies a sequence of pulsing vibrations to the animal. The pulsing vibrations may consist of vibrating for 0.5 s and no actuation 0.5 s. However, the pulse of vibration may be longer or shorter, and the no actuation time may also be longer or shorter.

Shove time. The pulsing vibrations may continue for a duration of the predetermined shove time. As per the above pulse time, the shove time may by 1.5 seconds. In other embodiments, the pulsing vibrations are applied for 10 seconds. Other shove times are also envisaged. In one example, the firm mode shove time is 5 seconds. After the pulse time has elapsed, a secondary stimulus may be applied, for example a shock or sound. There may be one or multiple shocks applied. The pulsing vibration and subsequent shock may repeat after a first shock has occurred, and so on.

If the animal corrects their speed during the shove programme, the processor 25 will deactivate the shove programme so no more stimulus or stimuli are applied to the animal from the shove programme.

Preferably the shove guidance programme takes precedence over the forward angle guidance programme. That is, should the controller be activating the shove guidance programme and then the heading threshold is not met, the shove programme will continue to be activated until the animal speed has been corrected.

Gentle:

The gentle mode of will modify the variables of the programme, or be a modified version thereof. For example, one or more of the below variables may be modified.

The activation speed is preferably lower than the corresponding firm mode. As such, the animal needs to be moving slower compared to the firm mode for the processor 25 to activate the shove programme. For example the activation speed is between 0 and 100 mm/s.

The deactivation speed is preferably lower than firm mode. As such, the animal doesn't need to be moving as fast as the firm mode for the processor 25 to deactivate the shove programme. For example, the deactivation speed is 110 mm/s or more.

The delay time is longer compared to the firm mode, as such the animal 1 can stay still for longer, or move slower for longer compared to the firm mode. For example, the delay time is 30 seconds of pulsing vibration before a shock is applied.

The pulse time is longer compared to the firm mode, this gives a more relaxed or less intense stimulus effect.

The shove time is shorter compared to the firm mode, this gives the animal a longer time to correct their speed, or start moving, before the shove time is ended and a secondary stimulus is applied.

The above guidance programmes are general examples of the differences between a firm mode and gentle mode and exemplary scenarios where each mode may be implemented. The modification, or differences, in variables can be extended to many use cases and a variety of stimulus modes. Generally increasing the time between events, such as the time before activating a guidance programme, activating a stimulus, activating a later or subsequent stimulus, gives the animal more time and likely reduces stress, as is desired by the gentle mode. Likewise, increasing the freedom of the animal to move around the transition area, and change heading more often, and/or in great angles, compared to firm mode gives the animal more movement freedom and likely reduces stress, as is desired by the gentle mode.

Other variables such as speed ranges may also be different between the firm and gentle mode. Such as giving the animal more freedom to slow down and not be stimulated, or have a lower range set for desired speeds. Allowing animals to be able to move slower before being stimulated, or activating stimulus may allow the animal to explore more, reduce its stress, and may increase the likelihood of the animal crossing the difficult transition on its own time.

Further variables such as changing the type and/or application of the stimulus or stimuli may be utilised for firm and gentle modes. Stimulus type and application is more nuanced as different animals may have different reactions to different stimulus types and applications. However, in general lower intensity stimulus, more relaxed patterns of stimulus (i.e. time and frequency), increased time between stimuli, less painful stimulus are all associated with the gentle mode, compared to the firm mode.

Alternatively, the shove programme may be used on its own, independent of the guidance modes. Where the applying of pulsed vibrations has been found to encourage an animal to move towards a target heading, should the animal speed (i.e device speed) be below a low speed threshold. Once the animal speed is above a high speed threshold, the vibrations can be stopped. Preferably the low and high speed thresholds are not the same speed value. This particular stimulus application has been found to surprisingly efficient at increasing the speed of animals, yet keeping them calm and headed in the target heading.

Guidance Programme: Shock Lock-Out

Purpose: The device 20 applies a shock stimulus via the electrodes 350c to reinforce other previously applied stimulus such as sound and/or vibration. There will be situations where it is not desired to apply shock to an animal as the animal might not be able to move to correct its behaviour. This can be uncomfortable and stressful for the animal 1. For example, a cow is down calving or is down injured and cannot move, and having shock applied to it to try get the cow to move is not comfortable for the animal. However, it is not desired to stop guiding an animal if the animal is still able to move but is ignoring the guidance stimulus. As such, the shock lock-out guidance programme may have different settings depending on the mode, firm or gentle.

In both modes, the shock lock-out programme, if enabled, will disable any further shock stimulus, or any stimulus, guidance attempts, or other guidance programme, from being applied to the animal if a threshold number of shocks (or total energy applied, or total shock time, or the like) is applied to the animal within a particular time window. For example, the shock lock-out programme will disable any further stimuli being applied when the shock count reaches a Shock Limit of for example, 5 shocks, within a 5 minute window. The stimulus or guidance can be reactivated, or the shock lock-out disabled should another threshold or variable be met. These thresholds or variables will depend on the stimulus mode.

Firm

In the firm mode, the variables to can cause the shock lock-out programme to activate is:

Threshold number of shocks: This is the number of shocks that is administered by the electrodes before the controller turns off all guidance attempts that may result in further stimuli being administered. In the firm mode, the total number of shocks is between 5 and 15 shocks, preferably 5 shocks.

Time window: This is the time window in which the threshold number of shocks is counted. For example, if with a time window of 5 minutes, the threshold number of shocks is administered then the controller will turn off all guidance attempts, and no more stimulus will be administered. The time window maybe between 1 and 20 minutes, although a varying time window of less or greater time is also possible.

In the firm mode, the variables for the shock lock-out to de-activate once activated so guidance attempts can continue are:

Distance threshold: Where the device 20 needs to determine a distance moved by the animal is above a distance threshold. For example, to deactivate, the animal needs to 5 meters total moving distance, as sensed by the position sensor and determined by the controller, before any guidance attempts are continued; and/or.

Speed Threshold: Where if the device 20 determines the animal speed has reached or exceeds a certain animal speed the controller will deactivate the shock lock-out. For example if the processor 25 determines the device, i.e animal such as a cow, speed exceeds 500 mm/s. However a range of various speeds may be used dependent on the scenario and animal type. In an alternative embodiment, the animal speed reaching or exceeding a certain animal speed will reset the number of shocks to 0, but guidance programmes to stimulate the animal will not be reactivated until the distance threshold, or timeout threshold described below in the gentle mode, is met.

Gentle

In the gentle mode, the variables to can cause the shock lock-out programme to activate is:

Threshold number of shocks: This is the number of shocks that is administered by the electrodes before the controller turns off all guidance attempts that may result in further stimuli being administered. In the gentle mode, the total number of shocks is preferably less than the firm mode, for example between 2 and 5 shocks, preferably 3 shocks; and/or.

Particular time window: This is the time window in which the threshold number of shocks is counted. Preferably this time window is longer than the firm mode. For example, if within a time window of 8 minutes, the threshold number of shocks is administered then the controller will turn off all guidance attempts, and no more stimulus will be administered. The time window may be between 1 and 20 minutes, although a varying time window of less or greater time is also possible depending on the scenario and animal type.

In the gentle mode, the variables for the shock lock-out to de-activate once activated so guidance attempts can continue are:

Timeout: Instead of a distance threshold as in the firm mode, the gentle mode will implement a timeout time. In this embodiment, the processor 25 determines how much time has elapsed since the shock lock-out was activated, and if the time elapsed is greater than a threshold, then the shock lock-out will activate. For example, if a cow's 1 device 20 shock lock-out is activated, the shock lock out will not deactivate until a time of 3 minutes has passed. However the time range may be between 1 minute and 30 minutes, depending on the scenario and animal type. This is different to the distance threshold, as for guiding an animal such as a cow out of a paddock, it is assumed the animal is capable of moving, and is likely not moving because it is hesitant to cross a difficult transition. If a distance threshold, as utilised in the firm mode, is used then the animal may leave the transition area 4 and go back into the herd—this will be counterproductive to guiding the animal through the transition area 4. In one embodiment, both the firm and gentle mode use this timeout for drafting animals, i.e. excising them from the herd; and/or.

Speed Threshold: Where if the device 20 determines the animal speed has reached or exceeds a certain animal speed the controller will deactivate the shock lock-out. In the gentle mode, the speed threshold may be higher. For example if the controller 110 determines the device, i.e animal such as a cow, speed exceeds 600 mm/s. However a range of various speeds may be used depending on the scenario and animal type. In an alternative embodiment, the animal speed reaching or exceeding a certain animal speed will reset the number of shocks to 0, but guidance programmes to stimulate the animal will not be reactivated until the timeout threshold is met.

EXAMPLE USE CASES

Example 1: Paddock to Gate

One example of a path or heading that an animal will be guided along that has both an easy transition and a difficult transition is between a paddock (also known interchangeably as a break or field) and a gateway 10a which is an opening to allow ingress and egress of the animal 1 into said paddock. An example of paddock to gateway is shown in FIG. 7. FIG. 7 shows a paddock 2 to gateway 10a path from initial location 7 to the target location 8, across a difficult transition 10 having a transition area 4 shown with a periphery of dot-dash lines.

In this example, the animal has been previously restrained within paddock 2 and is not able to egress via the gateway 10a as the gateway 10a is closed via a physical gate. Closure of the gateway 10a may be from a physical gate, but is more likely to be by a virtual gate or invisible gate. The virtual gate is likely to be enforced/created by the current device 20 or similar device, where if either of the devices consider the gateway 10a to be closed will apply a stimulus to the animal to deter the animal from egressing out of the gateway 10a.

The transition area 4 may be an area defined about the gateway 10a when opened. For example, the transition area may be rectangle fully within both paddocks, and extending 20 m into the first paddock and 5 m into the second paddock. The path from initial location 7 to the transition area 4 is defined as an easy transition, and the path across the transition area 4 is defined as a difficult transition 10 subject to a gentle mode of stimulus and/or guidance programmes.

Example 2: Paddock to Paddock

One example of a path 6 that an animal 1 will be guided along that has both an easy transition and a difficult transition 10 is between a first paddock 2 and a second paddock 3 adjacent said first paddock. A portion of FIG. 8 shows a paddock to paddock path from initial location 7 to a waypoint 11, in this instance, the waypoint 11 is also the target location 8.

In said example, the animal has been previously restrained within said first paddock 2. Restraint may be from physical fences, but is more likely restrained by virtual or invisible fences. In some embodiments, the paddocks are a mixture of physical and virtual fences, or borders 5, of which define the paddocks. Likely said virtual fences 5 were also enforced/created by the current device 20.

A border 5, or one or more borders of the paddock may be 'dropped' or opened so as to allow the animal to cross the border without getting stimulated, or the device attempting to guide the animal away from the border 5 so as not to cross it. Due to the animal previously associating the area or line of the border with a virtual fence, it will be hesitant to cross the border. As such, the dropped border will be a difficult transition 10 for the animal. Compared to say, the paddock that the animal was restrained within, will be an easy transition for the animal to move around in.

The path from the initial location 7 to an waypoint 11, such as shown in FIG. 8, may start within the paddock and end within the second paddock.

The transition area 4 may be an area defined about the dropped border. For example, the area may be rectangular fully within both paddocks, and extending 20 m into the first paddock and 5 m into the second paddock. The path from initial location 7 to transition area 4 is defined as an easy transition.

The path may not be a direct line from initial location 7 to the transition area 4, but the processor 25 will attempt to guide the animal from the initial location 7 (which also may be the animal's current location) to the waypoint 11. The animal may wander during this period straying off the path. The controller 110 will then determine the new path required from the animal's current location to the waypoint 11 (or target location in other embodiments).

The processor 25 will apply the firm mode to the guidance programmes when the sensing device 140 determines its and/or the device's current location is within the defined transition area of the related transition, i.e the animal is within an easy transition area. For example, in the first paddock and outside the difficult transition area 4.

Once the sensing device determines it's and/or the device's location (e.g the animal's location) is within the area defined by the difficult transition area 4 then one or more gentle modes of the guidance programmes will be applied by the processor 25. The gentle mode guidance programmes aim to give the animal more time and freedom to explore the environment surrounding the difficult transition.

Example 3: Paddock to Paddock, Paddock to Gate

FIG. 8 further shows the path 6 continuing from the waypoint 11, through the second area 3 to the gateway 10a via another transition area 4. The entirety of FIG. 8 is an example of having multiple difficult transitions 10 along a path between an initial location 7 and a target location 8, where each difficult transition is associated with a gentle mode applied to the stimulus devices via the controller 110.

Example 5: Training

The invention may be used in the training of the animal wearing the device 20 with virtual fencing. When an animal first encounters virtual fencing it needs to be trained. The gentle mode may be implemented with the animal for training, such as initial encounters with virtual fencing or transitions. Once training is considered to be complete, firm mode may be used. Alternatively, firm mode is used for some transitions such as for easy transitions, and gentle mode is used for difficult transitions. In these cases, newly encountered, or recently encountered virtual boundaries are considered difficult transitions. However, instead of the target location being in or past the difficult transition, the target location is back within the paddock as the virtual boundary is configured to deter the animal from going near it or crossing it.

Example 6: Excising an Animal from the Herd (Drafting)

A herd animal such as a cow 1 may not want to leave the herd. If the cow 1 is to be drafted or excised from the herd using the device 20, then a gentle mode may be used whilst the animal is within and/or near the herd. In this embodiment the difficult transition is the part of the path that is within or adjacent to the herd. Once the cow 1 has left, or is further away from the herd, then the firm mode may be implemented by the processor 25. In this embodiment, as well as in other scenarios, the difficult transition may move with the herd, or move with time etc, e.g the difficult transition is not always a fixed location such as a gateway 10a opening, but may depend on where the herd is or should be. the device 20 may communicate with other devices 20 on other animals in the same herd.

Prediction of Difficult Transitions

The device 20 and/or system 18 may predict if an animal will have ease or difficulty, or will determine if an animal is having difficulty or not, crossing a transition, and apply the appropriate firm mode or gentle mode settings for said transition. This is contrary to or in addition to the user determining or deciding what the transition type (i.e difficult or easy) is in advance.

Alternatively, the device 20 and/or system 18 may predict or determine the transition type based on physical qualities. For example, if the transition was previously a virtual fence border for the same animal, it may be classed as a difficult transition. If the transition is a gateway that is formed by a narrower than usual opening, it may be classed as a difficult transition. In one embodiment, if the typical transition gateway is 5 m wide, and an upcoming transition gateway is 3 m wide, then the transition may be determined as a difficult transition.

The device may predict the transition type to be applied from prior animal behaviour at the said transition, or at similar or like transitions with similar features.

The device may predict the transition type to be applied from prior animal behaviours in general. Such as determining past collected animal behaviour profiles of the unique animal.

Such animal behaviours may include but are not limited to:

if the position sensing device information alludes to the device is moving slower than normal, then it may indicate the animal is moving slowly. Where normal speed may be determined from historical data of the animal speed.

if the position sensing device information alludes to the device is moving less fluidly, or not at a constant speed, then it may indicate the animal is more hesitant. Where typical speed averages may be determined from historical data of the animal speed.

if the position sensing device information alludes to the device moving away from the target location, or away from the heading tolerance threshold heading, then it may indicate the animal is more hesitant is less wanting to move in the correct direction towards the target location.

For example, if the animal was previously very hesitant or slow to pass through a particular transition, then gentle mode may be applied for the same transition next time. In another example, if the animal is known to be timid or hesitant in general over any transition then gentle mode may be used more often. If an animal is determined to dislike or be hesitant for particular physical transitions, such as narrow gateways, drainways, rivers, hedges openings etc, then gentle mode may be applied via the controller 110 when it is desired to guide the animal past or through these particular transitions.

All of the above examples of predicting the transition type can be utilised together with each other, so the device or system can learn from the animal's prior behaviours.

Firm and Gentle Stimulus Modes Over Time

The gentle and firm mode may not always be present on a given path. Instead a gentle mode may be used for guiding an animal, and the gentle mode may be more gentle compared to the firm mode used in the past or future to guide an animal. E.g the gentle mode does not necessarily need to be used adjacent to a firm mode, or adjacent a firm mode on the same path. For example, the initial location may be a location within a difficult transition area 4, and the target location is on the other side of the transition, but still within the transition area 4, then the sole mode of operation may be the gentle mode. The gentle mode in this instance will be comparative to firm mode used in historical or future events where the animal is guided to or away from a location or border.

Drafting

The primary benefit of the present invention is drafting individual animals from herds. Animals tend to want to stay with the herd and move with the herd, e.g they are hesitant to move in a direction different to the herd. The invention allows hesitant cows to be guided away from the herd, or kept still where the herd is moving.

Drafting can also take place in a raceway or out of the milking shed. The animal 1 with the device 20 can be guided in a direction different from the remainder of the associated herd. For example, if the herd is moving down the raceway, the animal 1 may be guided to move away from the herd and out through a gateway along the raceway.

Drafting can also be utilised to separate sick or in calf cows 1 away from the herd. The herd may be going to milking, and the invention may be implemented to guide the cow 1 to remain in the same spot. In this instance, the initial location of the animal may be the target location 8 and the gentle mode is utilised, whereas during typical guiding to a target, or around virtual fences, firm mode is utilised.
Herd The gentle mode may be utilised where it is determined there are many animals in one area trying to cross a transition. If the transition area 4 is small, or the transition is narrow, compared to the number of animals trying to cross it, then the gentle mode may be implemented on the device of the animal, and potentially to other devices for the other animals in the herd, to allow more time (or other benefits of gentle mode) to cross the transition.

If a herd of animals all, or nearly all, wearing like devices 20, are guided via their respective devices 1 to exit the paddock they are restrained in, the firm mode may be used at the transition of the exit of the paddock, should it be a gateway or previous virtual boundary. This is because the animals will less likely be hesitant since they are moving with the herd. However, should only a small portion of the herd, or few animals, down to one animal, be guided via their respective device 20 to exit the said paddock, then the transition at the exit of the paddock, should it be a gateway or previous virtual boundary, may be classified as a difficult transition.

The processor 25, should it receive a remotely sent exit command to exit the paddock, will determine what mode to apply to the respective transitions between the initial location and target location, depending on whether the command is a herd command (the same command sent to the herd of which the animal is part of) or a solitary command which has been sent to the single device only. For herd commands the transitions will likely all be classified as easy transitions and the firm mode applied accordingly. For solitary commands, the likely difficult transitions (such as openings, previous virtual border crossings, and the like) will be classified as difficult transitions and the gentle mode applied accordingly, whilst the cross paddock journey will be classed as an easy transition.
Miscellaneous Although the above description mostly describes a method of controlling the position(s) of a cow using the apparatus of the present invention, many other domesticated, farmed or even wild animals may be controlled using such methods.

A notable difference between the present invention and other state of the art method is that the present method actively attempts to guide an animal forwards through to a target location. Often this may occur along a path with way points along the path. Other prior art methods are merely restraining an animal within a virtual paddock, or trying to get an animal back into the virtual paddock from whence it came. It will of course be realised that while the foregoing has been given by way of illustrative example of the present invention, all such modifications and variations thereto as would be apparent to a person skilled in the art are deemed to fall within the broad scope and ambit of this invention as is hereinbefore described.

Instead of the device configured as a collar, many other forms that are suitable to be worn by an animal may be used with the apparatus of the present invention, such as but not limited to animal clothing, wearable straps, ear tags, bracelets, anklets, headbands, saddles etc.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

REFERENCE LIST

1 Animal
2 First Area
2*a* paddock, Paddock
3 Second Area
4 Transition area
5 Area Boundary
6 Path
7 Initial Location
8 Target Location
9 Easy Transition
10 Difficult Transition
10*a* Gateway
11 Waypoint
110 Controller
114 Memory
140 Position Sensing Device
18 System
20 Device
21. GPS
22. WiFI
23. Cellular/Radio
24. IMU/Accelerometer.
25. Processor
26. Antennae
350*a,b,c* Stimulus Device
820 user
830 mobile device
840 GPS satellites,
850 WIFI repeater/booster stations
860 cell towers
865 Internet
870 signal
880 cloud server
890 PC

We claim:

1. A wearable device configured to be worn by an animal, the device configured to guide the animal to a target location, the device comprising: at least one sensor configured to measure position data of the wearable device; at least one stimulus device operable to apply stimuli to the animal including an application of one or more of vibration, sound, and/or and shock stimulus operable to elicit a level of behavioural response from the animal; a controller configured to: a—receive data defining the target location, b—receive the position data of the wearable device, c—operate the at least one stimulus device according to one of a plurality of stimulus modes of the stimulus device including: a "first" stimulus mode, and a "second" stimulus mode, the second stimulus mode comprising stimuli operable to elicit a stronger level behavioural response than the first stimulus mode; d—approaching a historical virtual boundary of a geographical area previously associated with the application of a stimulus to the animal; and e—guide the animal to the target location according to a selection of: the stimuli mode based on the position data of the wearable device, and a guidance mode.

2. The device as claimed in claim 1, wherein the position data comprises data derived from an animal location sensor and/or an animal position sensor, and the position data comprises one or more of animal location data, animal heading data, animal speed data, or animal angular position data.

3. The device as claimed in claim 2, wherein the controller is configured to select the stimulus mode based on one or more of: a geographical data determination, historic data, and a user input.

4. The device as claimed in claim 3, wherein the historic data comprises one or more of: wearable device location data, and animal activity data, including stimulus data indicative of an application of a stimulus to the animal due to an association with a virtual boundary.

5. The device as claimed in claim 3, wherein the geographical data determination comprises a measure of proximity of the wearable device to one or more geographical features.

6. The device as claimed in claim 4, wherein the controller is configured to select the first stimulus mode based on the determination or receipt of data indicative of the device:

being outside a threshold distance to a threshold number of wearable devices worn by other animals;

approaching a virtual boundary for the first or second time;

approaching a virtual or physical gateway through a physical boundary;

within any predefined geographical area indicated as a low pressure stimulus mode area; and/or approaching a virtual gateway through a virtual boundary.

7. The device as claimed in claim 3, wherein the controller is configured to select the second stimulus mode based on the determination or receipt of data indicative of the device:

approaching a known virtual boundary;

being within a threshold distance to a threshold number of similar devices;

being within a geographical area defined by a virtual or physical paddock boundary;

being within any predefined geographical area indicated as a high pressure stimulus mode area, and/or being within a geographical area defining a raceway.

8. The device as claimed in claim 2, wherein the controller is configured to determine animal speed data and/or animal heading data, and select the guidance mode based on comparison of the speed data and/or heading data to one or more thresholds.

9. The device as claimed in claim 8, wherein the controller is configured to determine via the position data that the animal heading is within or outside a heading tolerance threshold, the heading tolerance threshold defined by an angle either side of a target heading, the target heading extending between the animal location and the target location.

10. The device as claimed in claim 9, wherein the heading tolerance threshold for the second stimulus mode is narrower than the first stimulus mode.

11. The device as claimed in claim 2, wherein the controller is configured to:

determine a difference between the animal heading and a target heading is outside of a predetermined heading tolerance threshold, then:

execute a first guidance mode comprising operating the stimulus device to apply a stimulus to guide the animal heading toward the target heading or desired target location.

12. The device as claimed in claim 9, wherein the controller is configured to determine a duration of time the animal is heading outside of the heading tolerance threshold, and operate the stimulus device to apply a first stimulus when a first threshold duration is exceeded, and apply further stimulus when a second threshold duration is exceeded.

13. The device as claimed in claim 10, wherein the controller, under the second stimulus mode of the first guidance mode, is configured to execute one or more of:

apply the first stimulus after a first time duration has elapsed since a difference between the animal heading and a target heading was outside of a predetermined heading tolerance threshold, apply the first stimulus for a predetermined duration shorter than the first stimulus mode, apply the first stimulus with an increasing intensity compared to the first stimulus mode, apply the first stimulus with an increasing frequency faster than compared to the first stimulus mode, apply the first stimulus with an increasing intensity over time, that increases faster compared to the first stimulus mode, apply the first stimulus with an increasing intensity over time that increases to maximum intensity within 10 seconds, apply the first stimulus with an intensity which increases proportionally to an increased heading value outside of the heading tolerance threshold, apply the first stimulus with an intensity which increases proportionally to a duration of time the animal is headed outside of the heading tolerance threshold, apply the further stimulus with intensity which is more intense compared to the first stimulus mode, and/or reduce the angle of the predetermined heading tolerance threshold.

14. The device as claimed in claim 10, wherein the controller, under the first stimulus mode of the first guidance mode, is configured to execute one or more of:

delay the first and/or second stimulus application time after a determination the animal heading is outside the tolerance threshold, wherein the delay time is at least 2 seconds and/or wherein the second stimulus is applied at least 5 seconds after the first stimulus;

increase the angle of the predetermined heading tolerance threshold compared to the second stimulus mode;

decrease the intensity of the stimulus type or stimulus application energy or stimulus application frequency compared to the second stimulus mode;

apply the first stimulus at incrementally increasing volumes;

apply the first stimulus with an increasing intensity over time, apply the first stimulus with an increasing intensity over time that increases faster than equivalent first stimulus under the second stimulus mode, apply the first stimulus with an increasing intensity over time that increases to maximum intensity within 15 seconds, and/or omit at least one of the first or second stimulus from a predetermined pattern of stimulus compared to the second stimulus mode.

15. A wearable device configured to be worn by an animal, the device configured to guide the animal to a target location, the device comprising:

at least one sensor configured to measure location position data of the wearable device;

at least one stimulus device operable to apply stimuli to the animal including an application of one or more of vibration, sound, and/or shock stimulus operable to elicit a level of behavioural response from the animal; and a controller configured to:

receive data defining the target location, receive the position data of the wearable device, operate the stimulus device according to one of a plurality of stimulus modes of the stimulus device including:

a "first" stimulus mode, and a "second" stimulus mode, the second stimulus mode comprising stimuli operable to elicit a stronger level behavioural response than the first stimulus mode;

guide the animal to the target location according to a selection of:

the stimuli mode based on the position data of the wearable device, and a guidance mode;

select the stimulus mode based on data, where the first stimulus mode is determined by data indicating the target location requires the animal crossing a prior virtual boundary of a geographical area that previously bound, deterred, restrained, or was used as a basis of a stimulus for the animal;

the second stimulus mode is determined by data indicating the target location requires the animal moving within a geographical area of or within an existing paddock or area of a paddock, physically or virtually bound;

determine a difference between the animal heading and a target heading relative a heading tolerance threshold, and determine the animal speed relative a low speed threshold, and if outside one or both of the heading tolerance threshold and speed threshold then:

execute a guidance mode operable to encourage movement of the animal based on the selected stimulus mode.

16. The device as claimed in claim 15, wherein the heading tolerance threshold and/or speed threshold for the second stimulus mode is narrower than the first stimulus mode.

17. The device as claimed in claim 15, wherein the controller is configured to determine if a difference between the animal heading and a target heading is outside of a predetermined heading tolerance threshold, then execute a first guidance mode comprising operating the stimulus device to an appropriate side of the animal operable to guide the animal heading toward the target heading.

18. The device as claimed in claim 15, wherein the controller is further configured to determine if the animal is headed outside of the heading tolerance threshold, and apply a first stimulus, the first stimulus being a sound, and the sound being applied to a side of the animal angled furthest from the target heading, and in the second stimulus mode, the first stimulus is a sound with an increasing intensity over time that increases slower than in the first stimulus mode.

19. The device as claimed in claim 15, wherein the target location is outside of the prior virtual boundary of a geographical area that previously bound, deterred, or restrained the animal previously.

20. The device as claimed in claim 16, wherein the prior virtual boundary of a geographical area that previously bound, deterred, or restrained the animal was enforced by the device.

21. A wearable device configured to be worn by an animal, the device configured to guide the animal along a target heading to a target location, the device comprising: a—at least one sensor configured to measure position data of the wearable device; b—at least one stimulus device operable to apply stimulus to the animal including an application of one or more of vibration, sound, and/or shock stimulus operable to elicit a level of behavioural response from the animal; c—a controller configured to: i—receive data defining the target location, ii—receive the position data of the wearable device, iii—operate the stimulus device according to one of a plurality of stimulus modes of the stimulus device including: a "first" stimulus mode, and a "second" stimulus mode, the second stimulus mode comprising stimuli operable to elicit a stronger level behavioural response than the first stimulus mode; iv—guide the animal to the target location according to a selection of: the stimulus mode based on the position data of the wearable device; v—select the first stimulus mode when position data is received indicating the animal is approaching or within a predefined area defined by an area comprising a virtual fencing boundary or gate that historically activated the stimulus device to stimulate the animal, vi—select the second stimulus mode when position data is received indicating the animal is approaching or within a predefined area defined by an area paddock which the animal was free to move within without prior historical stimulus applications from the stimulus device.

\* \* \* \* \*